(12) United States Patent
Tsujimoto

(10) Patent No.: US 9,916,308 B2
(45) Date of Patent: Mar. 13, 2018

(54) INFORMATION PROCESSING SYSTEM, DOCUMENT MANAGING SERVER, DOCUMENT MANAGING METHOD, AND STORAGE MEDIUM

(71) Applicant: CANON KABUSHIKI KAISHA, Tokyo (JP)

(72) Inventor: Koichi Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 14/248,895

(22) Filed: Apr. 9, 2014

(65) Prior Publication Data

US 2014/0317187 A1 Oct. 23, 2014

(30) Foreign Application Priority Data

Apr. 18, 2013 (JP) ................. 2013-087073

(51) Int. Cl.
| | | |
|---|---|---|
| G06F 15/16 | (2006.01) | |
| G06F 17/30 | (2006.01) | |
| H04L 29/06 | (2006.01) | |

(52) U.S. Cl.
CPC .. *G06F 17/30011* (2013.01); *G06F 17/30165* (2013.01); *H04L 65/4046* (2013.01)

(58) Field of Classification Search
CPC ............. H04L 65/403; G06F 17/30011; G06F 17/30165; G06F 17/30
See application file for complete search history.

(56) References Cited

U.S. PATENT DOCUMENTS

| | | | | |
|---|---|---|---|---|
| 7,916,333 B2* | 3/2011 | Yoshio | ............... | H04N 1/00212 358/1.15 |
| 8,438,113 B2* | 5/2013 | Stahl | ................... | G06Q 50/184 705/54 |
| 2004/0237041 A1* | 11/2004 | Koike | ................... | G06F 17/241 715/230 |
| 2008/0065761 A1* | 3/2008 | Wilson | ................. | G06Q 10/107 709/224 |
| 2008/0204827 A1* | 8/2008 | Yoshio | ............... | H04N 1/00212 358/498 |
| 2009/0307320 A1* | 12/2009 | Golan | ................. | G06Q 10/107 709/206 |
| 2011/0179119 A1* | 7/2011 | Penn | ...................... | G06Q 90/00 709/205 |
| 2012/0011103 A1* | 1/2012 | Joo | .................. | G06F 17/30864 707/687 |
| 2012/0131102 A1* | 5/2012 | Gabos | ................ | H04N 1/00153 709/204 |

(Continued)

FOREIGN PATENT DOCUMENTS

JP  2012-63808 A  3/2012

*Primary Examiner* — Ario Etienne
*Assistant Examiner* — Kidest Mendaye
(74) *Attorney, Agent, or Firm* — Fitzpatrick, Cella, Harper & Scinto

(57) ABSTRACT

Provided is a document management service that accepts a request for sharing a document from a user of client terminal so as to determine whether or not the document to which the sharing request was made has been successfully registered in a document management server as a sharing target among users. If the document has failed to be registered, the document management service posts the document to a microblog service.

9 Claims, 20 Drawing Sheets

(56) References Cited

U.S. PATENT DOCUMENTS

| | | | |
|---|---|---|---|
| 2012/0290308 A1* | 11/2012 | Detwiller | G06Q 30/02 705/1.1 |
| 2012/0290654 A1* | 11/2012 | Detwiller | G06Q 30/02 709/204 |
| 2013/0091550 A1* | 4/2013 | Joyce | G06F 21/00 726/4 |
| 2014/0201062 A1* | 7/2014 | Ruebush | G06Q 40/025 705/38 |
| 2014/0325327 A1* | 10/2014 | Belvin | G06F 17/30887 715/208 |

* cited by examiner

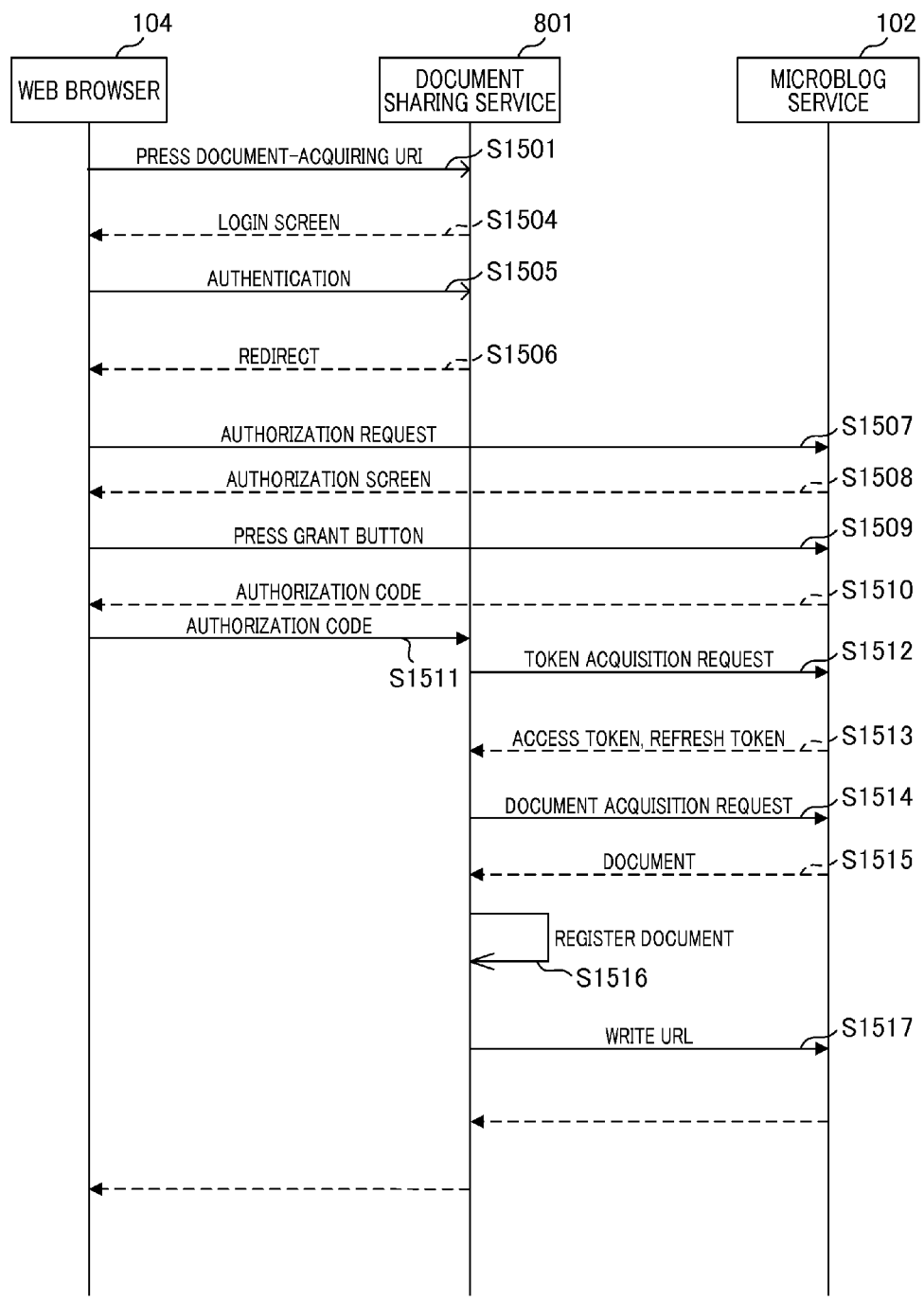

INFORMATION PROCESSING SYSTEM, DOCUMENT MANAGING SERVER, DOCUMENT MANAGING METHOD, AND STORAGE MEDIUM

BACKGROUND OF THE INVENTION

Field of the Invention

The present invention relates to an information processing system, a document management server, a document managing method, and a storage medium.

Description of the Related Art

There has been an increase in the speed of network lines and improvements in grid-computing technology due to the development of network infrastructure. Consequently, there has been proposed a cloud computing system as a system for implementing a document management service which performs management of document files and various types of processing on a server computer side. A user accesses a Web page of a cloud service from a browser on client computer via Internet so as to upload, download, display, or share document files and form data.

Some of the cloud-based services include a microblog function. A microblog service provided by the microblog function is one of communication services. A user who has an account with the service can post a short message to a server having the microblog function. A unique identifier is assigned to each posting. A posting by the user himself, a posting by another user who has "followed", and a posting to a group to which the user belongs are displayed on a user-dedicated Web page called "timeline", so that communication via follow-up or group interaction can be made.

The term "follow" refers to register another user so that a posting by another user can be displayed on his/her own Web page. The term "group" refers to a user group classified into users who share common properties such as organization to which they belong, project in charge to which they are assigned, and the like. A posting to a group is only displayed on the Web pages of the users who belong to the group. For example, Chatter of Salesforce.com is responsible for the microblog service as described above.

Also, in the aforementioned document management service, interaction with other services is becoming increasingly important, and the presence of a document can be reported to other users by posting URL information for access to the document and information for sharing the document to a microblog service. Japanese Patent Laid-Open No. 2012-63808 discloses a system in which, when an image is stored in a server prior to user registration processing, the image is stored in a temporal storage server with the image linked with a temporal user ID and data of the image is transferred from the temporal storage server to an image upload server upon registration of a user ID.

An information processing system in which a document management server having a document management function interacts with a posting management server having a microblog function (posting management function) is contemplated. For example, the document management server is comprised of three cloud service servers: a document sharing server, an authentication server, and a document generating server, and the document management server includes a document generating server and a document sharing server having a document sharing function.

When a document generating instruction is issued by a user, the document generating server generates a document and then transmits an operation selection screen to the user. When the user selects a sharing destination group for the document on the operation selection screen and presses a document sharing button, the document generating server accesses an authentication server to confirm user authority, and then transmits the document and a document sharing request to the document sharing server.

The document sharing server stores (registers) the document in accordance with parameters included in the document sharing request, issues a URI for accessing the document, and returns the URI to the document generating server. The document generating server posts the URI as the user to the posting management server. A posting destination at this time is a group on a microblog service selected by the user on the operation selection screen of the document generating server. When another user who belongs to the same group presses the posted URI, the authentication service provided in the document management server executes authentication processing, and the user accesses the document sharing server. When the user who has accessed the document sharing server is a user who has granted access thereto, a preview screen of the document is displayed.

When the document management server having the configuration as described above is provided as a cloud service, a document may fail to be transmitted or registered from the document generating server to the document sharing server. When a user cannot transmit a document to the document sharing server via the document generating server due to failures in the document sharing server and insufficient user authority, the following processing needs to be performed so as not to lose the advantage for sharing the document with other users in the posting management server. Specifically, the document needs to be registered again in the document sharing server at the stage whereat the document generating server temporarily stores the document to make it available for the document sharing server. Thus, when the user cannot register the document as a sharing target in the document sharing server, sharing the document with other users is not realized.

When a user who has generated a document does not have authority to utilize the document sharing server, it is also contemplated that the user may request another user who has authority to utilize the document sharing server to directly submit the document to the document sharing server without intervention of the document generating server. In such a case, a sharing destination group name needs to be stored for use upon registration in order to register the document in the document sharing server with a group intended by the user who has generated the document.

SUMMARY OF THE INVENTION

The present invention provides an information processing system that is capable of sharing a document with other users while holding a user-intended setting even when the user cannot register the document in a server having a document sharing function.

According to an aspect of the present invention, an information processing system is provided that includes a document management server that has a document sharing function; and a posting management server that communicates with the document management server via a network and has a posting management function. The document management server includes an accepting unit configured to accept a request for sharing a document from a user; a registering unit configured to register the document to which the sharing request has been made as a sharing target among users in the document management server; a determining unit configured to determine whether or not the document has been successfully registered by the registering unit; and a posting unit configured to post the document to the posting management server if the determining unit determines that the document has failed to be registered by the registering unit.

Further features of the present invention will become apparent from the following description of exemplary embodiments with reference to the attached drawings.

BRIEF DESCRIPTION OF THE DRAWINGS

FIG. 16 is a diagram illustrating document reacquisition processing for a document sharing service.

DESCRIPTION OF THE EMBODIMENTS

Figure 1:
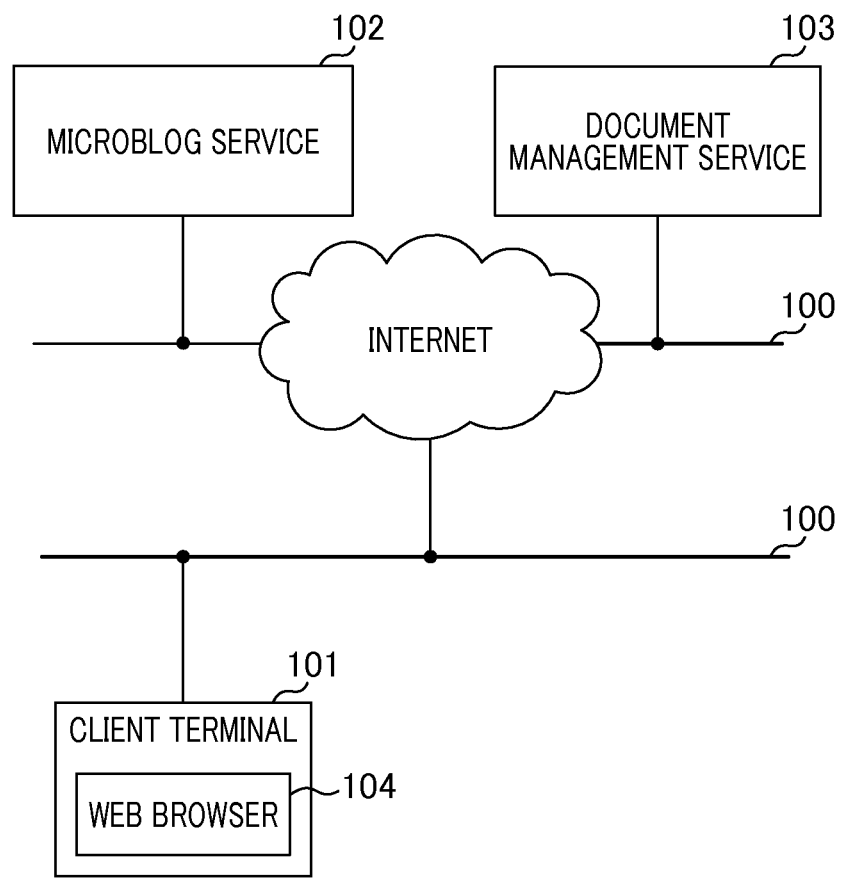
FIG. 1 illustrates an exemplary system configuration according to the present embodiment.

FIG. 1 is a diagram illustrating an exemplary system configuration according to the present embodiment. The information processing system shown in FIG. 1 includes a document management service 103 and a microblog service 102. The document managing method of the present embodiment is implemented by the information processing system shown in FIG. 1. The computer program of the present embodiment causes a computer to execute the document managing method. The microblog service 102 has a microblog function. Specifically, the microblog service 102 functions as a posting management server having a posting management function. The microblog service 102 writes/reads a message or provides user information in response to a request from a client terminal 101 or the document management service 103. The client terminal 101 is an information processing device which is operated by a user. The client terminal 101 includes a Web browser 104.

The document management service 103 has a document management function. Specifically, the document management service 103 is a document management server that performs document management such as registration, deletion, browsing, update, and the like of a document in response to a request from the client terminal 101. The document management service 103 stores a document by linking with a URL for uniquely identifying the document, so that the document can be shared among users managed by the document management service 103, where URL is an abbreviation for Uniform Resource Locator.

The microblog service 102, the document management service 103, and the client terminal 101 are communicably connected to each other via a network 100. Examples of the network include any one of the Internet, LAN, WAN, telephone line, dedicated digital line, ATM, frame relay line, cable television line, and data broadcasting radio channel, and the like, where LAN is an abbreviation for Local Area Network, WAN is an abbreviation for Wide Area Network, and ATM is an abbreviation for Asynchronous Transfer Mode. The network is also a so-called communication network implemented by combining them. As the network, any type of network may be used if it can transmit/receive data. Furthermore, a communication unit from the client terminal 101 to the microblog service 102 and the document management service 103 may differ from a communication unit between services.

Figure 2:
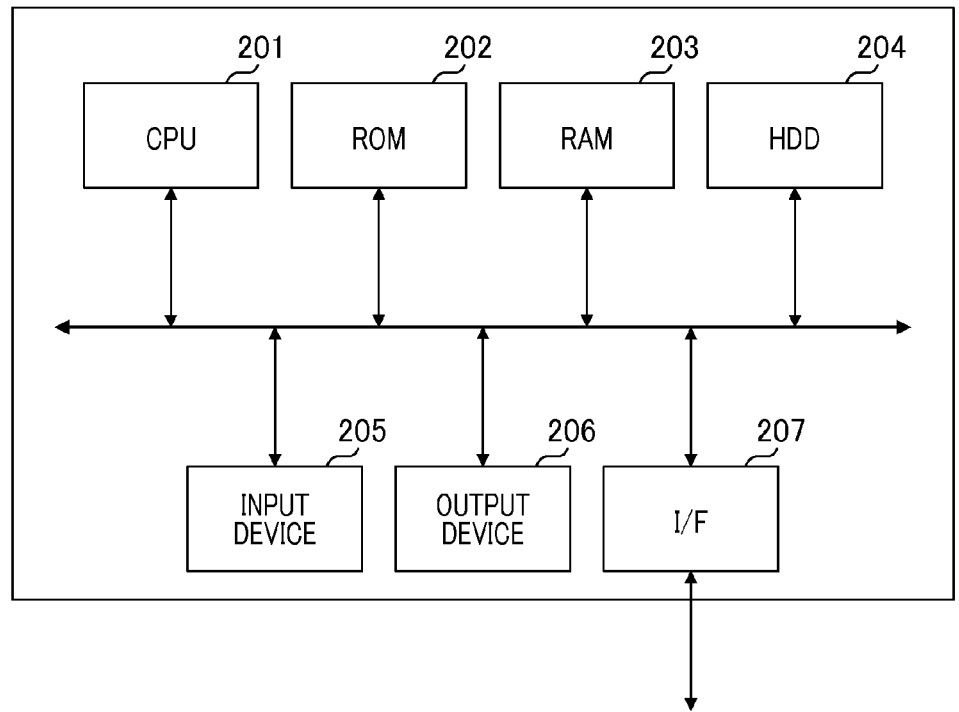
FIG. 2 illustrates an exemplary hardware configuration of a client device, a microblog service, and a document management service.

FIG. 2 is a diagram illustrating an exemplary hardware configuration of the client terminal 101, the microblog service 102, and the document management service 103 shown in FIG. 1. In FIG. 2, a CPU 201 directly or indirectly controls devices (ROM, RAM, and the like to be described below) which are connected to each other via an internal bus. The CPU 201 executes programs for implementing operations of the client terminal 101, the microblog service 102, and the document management service 103 according to the present embodiment, where CPU is an abbreviation for Central Processing Unit.

A ROM 202 stores BIOS, where ROM is an abbreviation for Read Only Memory and BIOS is an abbreviation for Basic Input/Output System. A RAM 203 is a direct storage device that is used as a work area for the CPU 201 or is used as a temporal storage area for loading a software module for implementing the present invention, where RAM is an abbreviation for Random Access Memory.

An HDD (Hard Disk Drive) 204 is an indirect storage device that stores an operating system (OS) which is basic software and software modules, where OS is an abbreviation for Operating System. A solid state drive (SSD) may also be provided instead of the HDD 204.

An input device 205 inputs information to an apparatus. The input device 205 is, for example, a keyboard, a pointing device, and the like (not shown). An output device 206 outputs information from an apparatus. A display is connected to the output device 206. An I/F (Interface) 207 is an interface for the connection to the network 100.

After the apparatus shown in FIG. 2 is activated, the CPU 201 executes the BIOS, and the OS is executably loaded from the HDD 204 onto the RAM 203. The CPU 201 executably loads various software modules corresponding to the functions of servers and clients from the HDD 204 onto the RAM 203 as needed in accordance with the operation of the OS. The various software modules are executed by the CPU 201 for operation in cooperation with the aforementioned devices. The I/F 207 is connected to the network 100, and is controlled by the CPU 201 in accordance with the operation of the OS so as to implement communication with other apparatuses.

<Software Module Configuration of Microblog Service>

Figure 3:
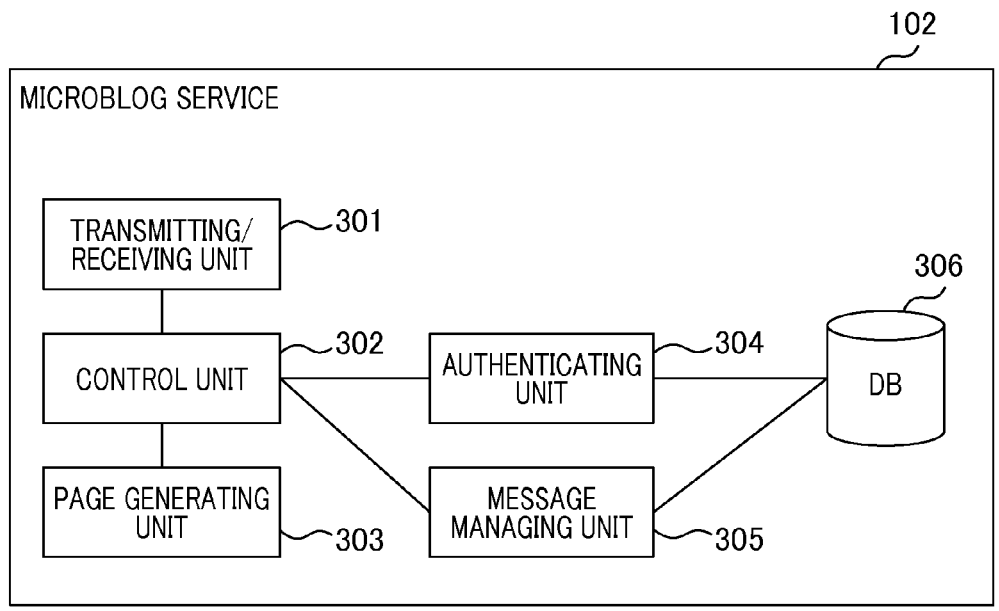
FIG. 3 is a diagram illustrating a configuration of a software module running on a microblog service.

FIG. 3 is a diagram illustrating a configuration of a software module running on the microblog service 102. Note that the respective software modules are stored in the HDD 204 shown in FIG. 2, are loaded onto the RAM 203 by the CPU 201 as described above, and are executed by the CPU 201. The microblog service 102 includes a transmitting/receiving unit 301, a control unit 302, a page generating unit 303, an authenticating unit 304, a message managing unit 305, and a message DB (database) 306.

The transmitting/receiving unit 301 processes communication with the Web browser 104 of the client terminal 101 and the document management service 103. The control unit 302 executes processing in accordance with a request accepted by the transmitting/receiving unit 301. The page generating unit 303 generates a Web page for returning a response to the Web browser 104. The authenticating unit 304 authenticates a user who submits a login request. In addition, the authenticating unit 304 manages access rights to information such as user information, group information, client information, and token information.

The message managing unit 305 stores message data in the message DB 306, and acquires the message from the message DB 306 or updates the message in response to the request. As message data, a file may be used in addition to a character string. The file can be acquired and updated similar to the message.

The message DB 306 stores message data and the aforementioned access rights information for the microblog service 102. The settings of message data and access rights information stored in the message DB 306 are updated by a user (administrator) at any timing via the Web browser 104.

<Authentication/Authorization for the Microblog Service 102>

Figure 4A:
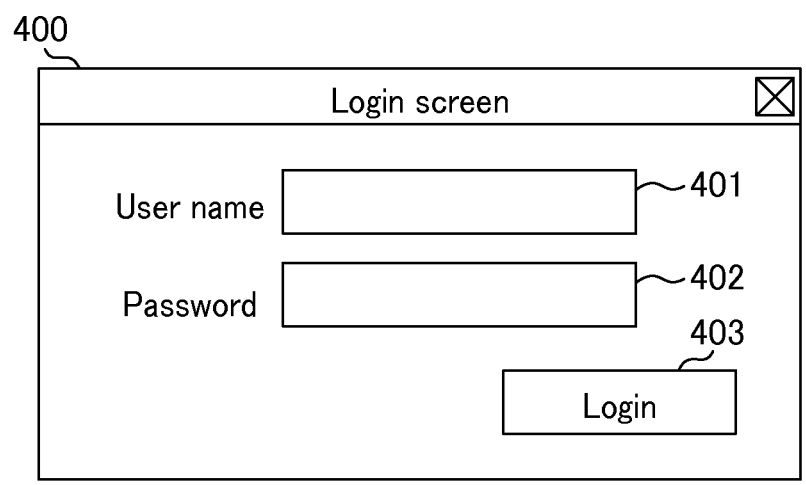
FIGS. 4A and 4B illustrate examples of a login screen and an authorization screen.
Figure 4B:
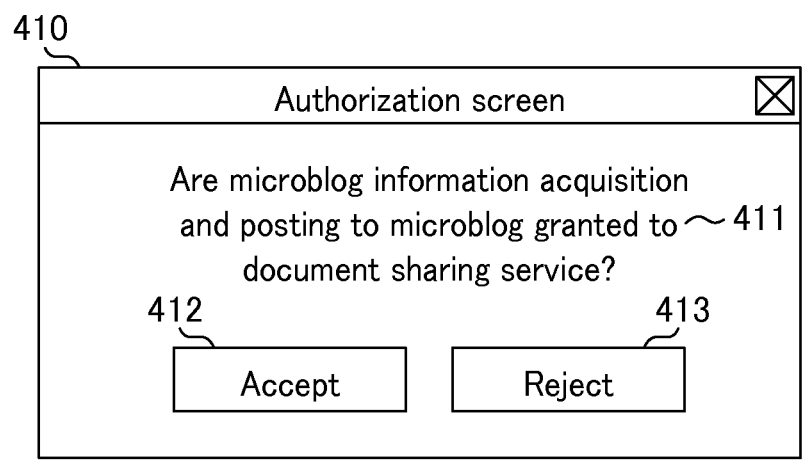

FIG. 4 is a diagram illustrating examples of a login screen 400 and an authorization screen 410 to be displayed on the Web browser 104 of the client terminal 101. The page generating unit 303 of the microblog service 102 generates the login screen 400 and the authorization screen 410. FIG. 4A shows the login screen 400 and FIG. 4B shows the authorization screen 410.

When a request is made from the Web browser 104 to the microblog service 102, the transmitting/receiving unit 301 accepts the request, and the control unit 302 assigns processing to the authenticating unit 304. The authenticating unit 304 to which the request has been assigned determines whether or not an authentication session is valid, and then notifies the control unit 302 of the results of whether the authentication session is valid or invalid.

When the authentication session is invalid, the control unit 302 instructs the page generating unit 303 to generate the login screen 400, and sends the login screen 400 as a reply to the request. When the authentication session is valid, the control unit 302 generates the authorization screen 410 and a timeline screen 600 to be described below in response to the request and sends them as a reply to the request.

The authentication session is managed by the authenticating unit 304 using a session ID, and is returned to the Web browser 104 when authentication is successfully completed. The Web browser 104 can continue authentication by adding a session ID to a request. All the requests to be made to the microblog service 102 are session-managed by the authenticating unit 304. When the microblog service 102 receives a request, the authentication session must always be verified. In the present embodiment, the verification of the authentication session will be omitted hereinafter.

The login screen 400 shown in FIG. 4A has a user name 401, a password 402, and a login button 403. The user name 401 and the password 402 are input fields for a user name and a password required for authentication to the microblog service. When the login button 403 is pressed, the Web browser 104 makes a login request to the microblog service 102 using the input user name 401 and password 402 as parameters.

The authorization screen 410 shown in FIG. 4B has an authorization message 411, an accept button 412, and a reject button 413. The authorization screen 410 is a screen for verifying with the user whether access to information managed by the microblog service 102 is granted (authorized) to the document management service 103. As a method for authorization, the OAuth protocol is used. Specifically, the authorization screen 410 is an example of the authorization screen defined by the OAuth protocol.

When the document management service 103 generates, acquires, updates, or deletes information managed by the microblog service 102, the document management service 103 makes an authorization request to the microblog service 102 via the Web browser 104 using a scope as a parameter. The scope is a range of authorization. In the present embodiment, information acquisition and a message posting from the microblog service 102 are designated by a scope as a range of authorization.

When the transmitting/receiving unit 301 of the microblog service 102 receives an authorization request, the control unit 302 instructs the page generating unit 303 to generate the authorization screen 410, and sends the authorization screen 410 as a reply to the authorization request made from the Web browser 104.

The authorization message 411 is a message for providing information relating to authorization to a user. In the present embodiment, a message for requesting authorization for information acquisition and a message posting from the microblog service 102 to the document sharing service 801 designated by the scope is displayed as the authorization message 411. When the accept button 412 is pressed, an authorization granting request is made to the microblog service 102. When the reject button 413 is pressed, an authorization rejecting request is made to the microblog service 102. The microblog service 102 that has accepted the authorization granting request causes the authenticating unit 304 to issue an authorization code, and then transmits the authorization code to the document management service 103 via the Web browser 104.

The document management service 103 transmits a token acquisition request to the microblog service 102 using the received authorization code and client information as parameters. The microblog service 102 that has received the token acquisition request verifies that the requested client information and the client information 520 match to thereby issue token information 530. The microblog service 102 returns an access token 532 and a refresh token 533 to the document management service 103 as a reply to the token acquisition request.

The document management service 103 can execute a request made by the microblog service 102 in a range of scope by adding the access token 532 to the request made to the microblog service 102. The refresh token 533 is a token for updating the access token 532. When receiving a refresh token and client information from a token update request, the microblog service 102 verifies whether the stored refresh token 533 and client information 520 match. When it is verified that the refresh token 533 and the client information 520 match, the microblog service 102 updates the access token 532 and the refresh token 533. The microblog service 102 returns the newly-updated access token 532 and refresh token 533 as a reply to the token update request.

A validity period for use is set for each of the access token 532 and the refresh token 533. When a validity period for use of the access token 532 is expired, the access token 532 can be updated using the refresh token 533.

FIG. 5 is a diagram illustrating user information 500, group information 510, client information 520, and token information 530. The user information 500, the group information 510, the client information 520, and the token information 530 are managed by the authenticating unit 304 of the microblog service 102 and are stored in the message DB 306.

Figure 5A:
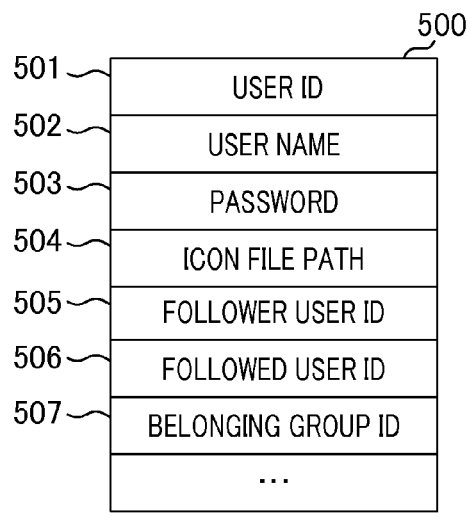
FIGS. 5A to 5D illustrate user information, group information, client information, and token information.

The user information 500 shown in FIG. 5A has a user ID 501, a user name 502, a password 503, an icon file path 504, a follower user ID 505, a followed user ID 506, and a belonging group ID 507.

The user ID 501 is an identifier for uniquely identifying the user information 500. The user name 502 and the password 503 are a user name and a password required for authentication. The icon file path 504 is a storage destination file path of the icon image of a user. The follower user ID 505 is the user ID of a user who follows the user indicated by the icon image, and a plurality of user IDs can be stored therein. The followed user ID 506 is the user ID of a user followed by a follower user, and a plurality of user IDs can be stored therein. A description will be given below about the term "follow". The belonging group ID 507 is the group ID of a group to which a user belongs and a plurality of group IDs can be stored therein.

Figure 5B:
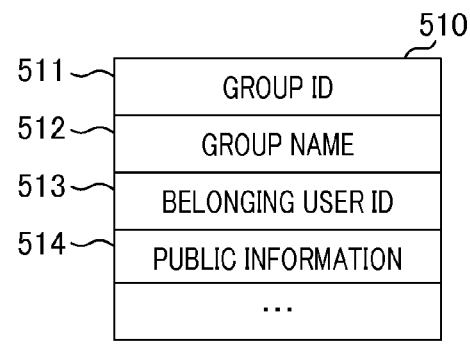

The group information 510 shown in FIG. 5B has a group ID 511, a group name 512, a belonging user ID 513, and public information 514. A user can generate a group and belong to the group. The group ID 511 is an identifier for uniquely identifying the group information 510. The group name 512 is the name given to a group. The belonging user ID 513 is the user ID of a user who belongs to a group, and a plurality of user IDs can be stored therein. The public information 514 is a flag for determining whether or not a user other than users who belong to a group can access group information, and is set as public or private.

Figure 5C:
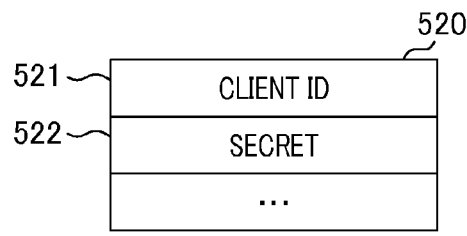

The client information 520 shown in FIG. 5C has a client ID 521 and a secret 522. The client ID 521 is an identifier for uniquely identifying the client information 520 about a client connected to the microblog service 102. The secret 522 is the password for the client. The client ID 521 and the secret 522 are issued by the microblog service 102. The client can make an authorization request to the microblog service 102 using the client ID 521 and the secret 522.

Figure 5D:
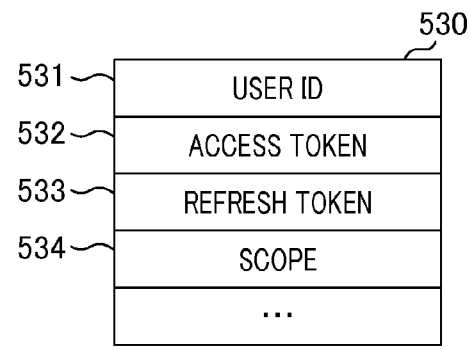

The token information 530 shown in FIG. 5D has a user ID 531, an access token 532, a refresh token 533, and a scope 534. The token information 530 is information for managing a token issued by authorization. The user ID 531 is the user ID of a user who issued a token. The access token 532 is a token to be used when a client makes a request. The refresh token 533 is a token for updating the access token 532. The scope 534 registers the range of authorization.

The microblog service 102 provides a microblog function. The microblog function is a function that realizes to share a message posted to the microblog service 102 by a user with other users or other groups. A user can post a message, post a message to a group to which the user belongs, and reference a shared message. The microblog service 102 also provides a function that posts a comment to the posted message.

Figure 6A:
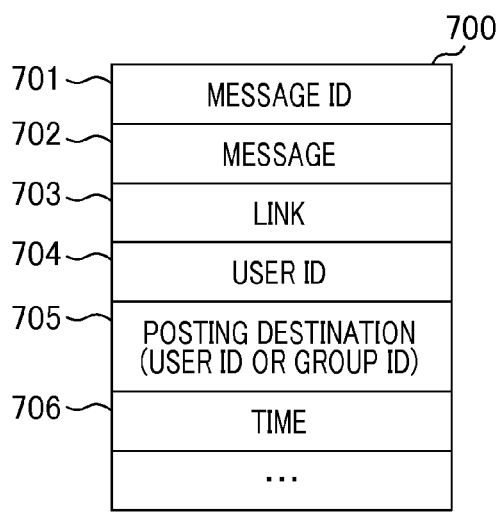
FIGS. 6A and 6B are examples of posted message information and posted comment information.

FIG. 6 is a diagram illustrating examples of message information 700 and comment information 710 posted to the microblog service 102. The message information 700 shown in FIG. 6A has a message ID 701, a message 702, a link 703, a user ID 704, a posting destination 705, and a time 706. The message information 700 is generated by the message managing unit 305 when the microblog service 102 accepts a message posting request, and is stored in the message DB 306.

The message ID 701 is an identifier for uniquely identifying the message information 700. Specifically, the message ID 701 functions as posting identification information for identifying posting. The message 702 is the character string and the file of a posted message. The link 703 is a posted URL. The user ID 704 is a user ID for uniquely identifying a user who posted the message. The posting destination 705 indicates a destination to which a massage is posted. The posting destination 705 stores a plurality of types of information such as a user ID, a group ID, and the like. When no destination is specified, nothing is stored in the posting destination 705. The time 706 is a date and time at which a message has been posted.

Figure 6B:
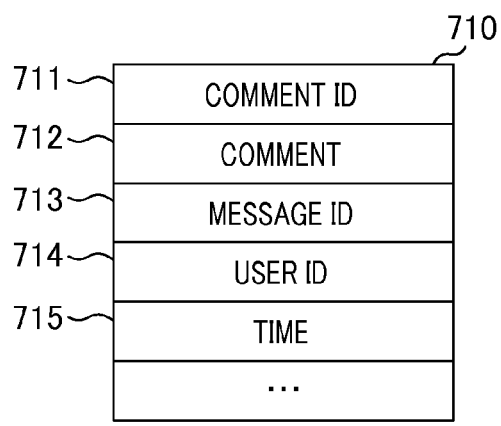

The comment information 710 shown in FIG. 6B has a comment ID 711, a comment 712, a message ID 713, a user ID 714, and a time 715. The comment information 710 is generated by the message managing unit 305 when the microblog service 102 accepts a comment posting request, and is stored in the DB 306. The comment ID 711 is an identifier for uniquely identifying the comment information 710. The comment 712 is character string of the posted comment. The message ID 713 is the message ID in the message information 700 about which a comment is posted. The user ID 714 is the user ID of a user who posted a comment. The time 715 is a date and time at which a user posted a comment.

Figure 7A:
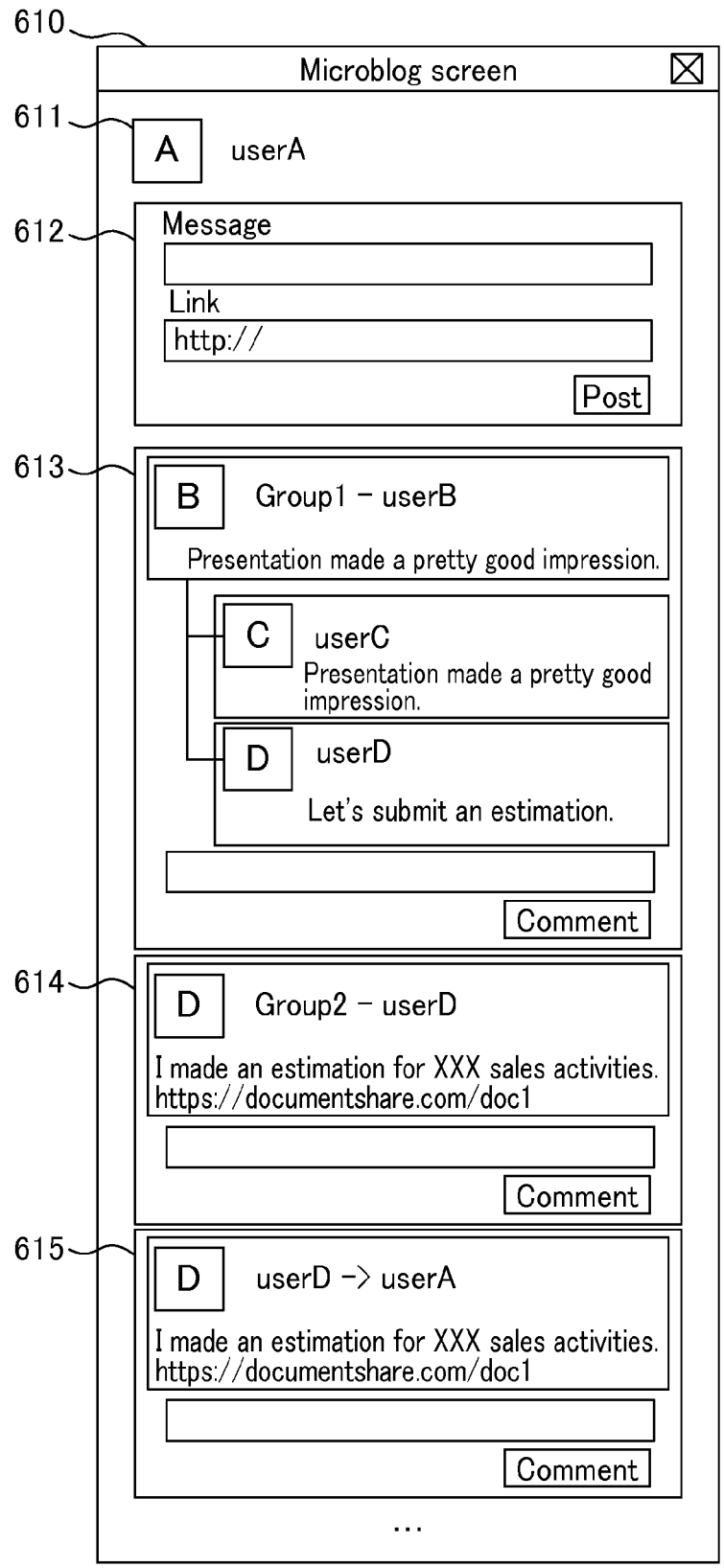
FIGS. 7A to 7C illustrate examples of timeline screens.
Figure 7B:
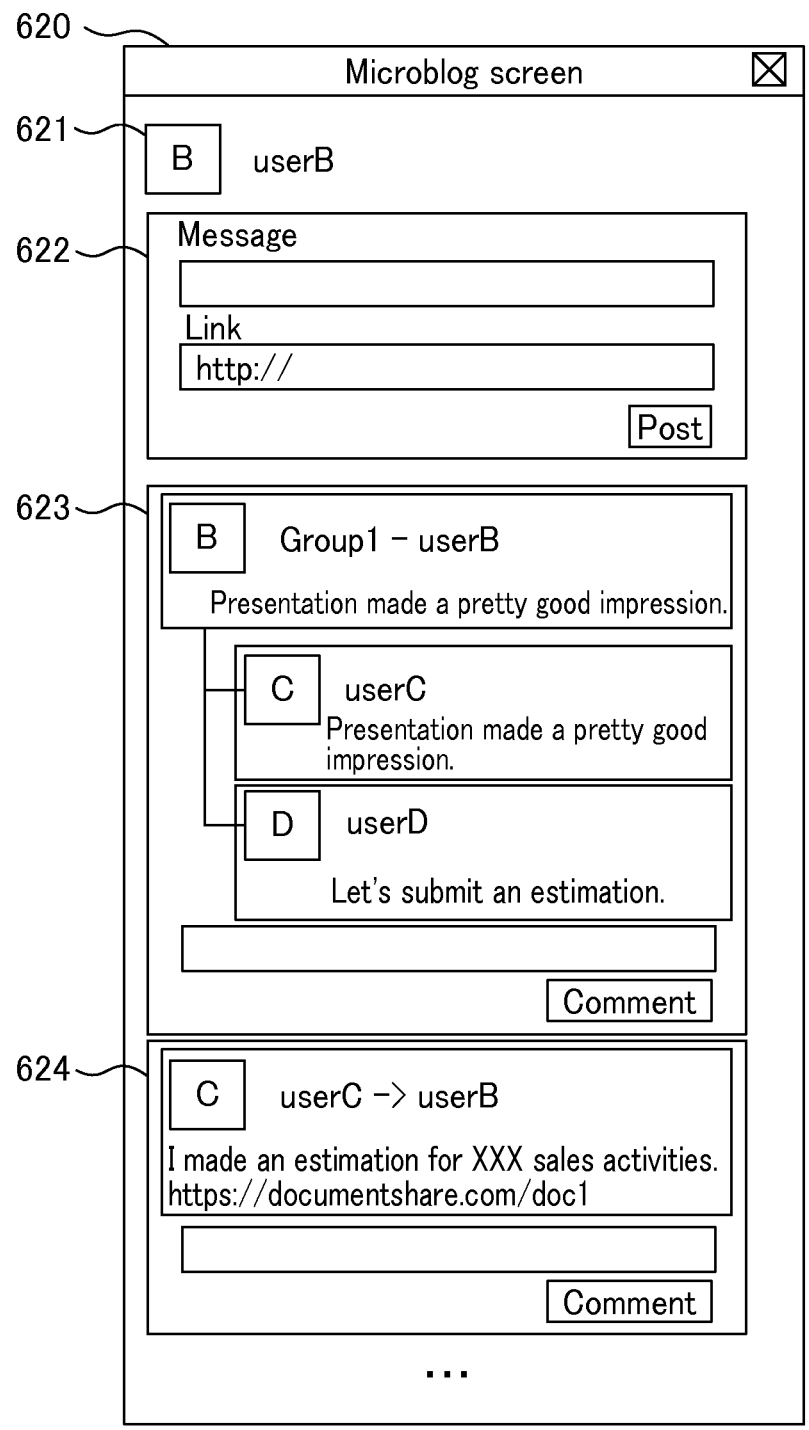

FIG. 7 is a diagram illustrating an example of the user's timeline screen displayed on a Web browser. The timeline of a user A is displayed on a timeline screen 610 shown in FIG. 7A. The timeline of a user B is displayed on a timeline screen 620 shown in FIG. 7B.

Upon successful authentication, the microblog service 102 generates the timeline screen of a user who has been authenticated, and returns the timeline screen to the Web browser 104. The user's timeline screen has a user information display area (611, 621), a message posting area (612, 622), and a comment posting area (613 to 615, 623, and 624).

The user information display area (611, 621) has a user icon and a user name. The user icon is an image stored in the icon file path 504, and the user name displays information about the user name 502. The message posting area (612, 622) has a message input field, a link input field, and a post button. When the post button on the Web browser 104 is pressed, the Web browser 104 makes a message posting request to the microblog service 102 using information input to the message input field and the link input field as parameters. The microblog service 102 that has received the message posting request generates the message information 700, and then generates a timeline screen again so as to return the timeline screen to the Web browser 104.

The comment posting area (613 to 615, 623, and 624) has a message display area, a comment display area, a comment input field, and a comment button. The message display area has the user icon of a user who posted a message, the user name 502, the posting destination, the message 702, and the link 703. The user icon is an image, which is stored in the icon file path 504, linked with the user ID 704. The posting destination is the user name 502 or the group name 512 which is respectively linked with the user ID or the group ID stored in the posting destination 705. Comment information having the message ID 713 which coincides with the message ID 701 of a message displayed on the message display area is displayed on the comment display area in the order of the time 715 from a new one.

The comment display area has the user icon of a user who posted a comment, the user name 502, and the comment 712. The user icon is an image, which is stored in the icon file path 504, linked with the user ID 714. When the comment button is pressed, the Web browser 104 makes a comment posting request to the microblog service 102 using input data in the comment input field as a parameter. The microblog service 102 that has received the comment posting request generates the comment information 710, and then generates a timeline screen again so as to return the timeline screen to the Web browser 104.

The comment posting area 613 is an example of the area in which comments from the user C and the user D on a message posted to the Group 1 by the user B are displayed. The comment posting area 614 is an example of the area in which a message posted to the Group 2 by the user D and a link to the message are displayed. The comment posting area 615 is an example of the area in which a message posted to the user A by the user D and a link to the message are displayed. The comment posting area 623 is the same as the comment posting area 613. The comment posting area 624 is an example of the area in which a message posted to the user B by the user C and a link to the message are displayed.

The message information 700 displayed on a user's timeline screen satisfies, for example, the following conditions:
(1) The user ID 704 coincides with the user ID 501 or the follower user ID 505.
(2) The user ID of the posting destination 705 coincides with the user ID 501 of the user himself.
(3) The group ID of the posting destination 705 coincides with the belonging group ID 507.

A user's timeline screen can also reference another user's timeline screen. Since another user's timeline screen is linked with the user name on the timeline screen, another user's timeline screen can be displayed by pressing the user name linked therewith. The message information 700 displayed on the timeline of another user satisfies the following condition:
(4) The user ID 704 coincides with the user ID 501 of the user himself or a display user.
(5) The user ID 704 coincides with the follower user ID 505 of the display user.
(6) The group ID of the posting destination 705 coincides with the belonging group ID 507 of a group to which the display user belongs and the public information 514 is open to public.

The message information 700 that satisfies the aforementioned conditions and the comment information 710 linked with the message are displayed on a user's timeline screen. Note that the display order in the comment display area is in the order of a time series from new to old between the time 706 at which the message information 700 was posted and the time 715 at which the comment information 710 was posted.

Figure 7C:
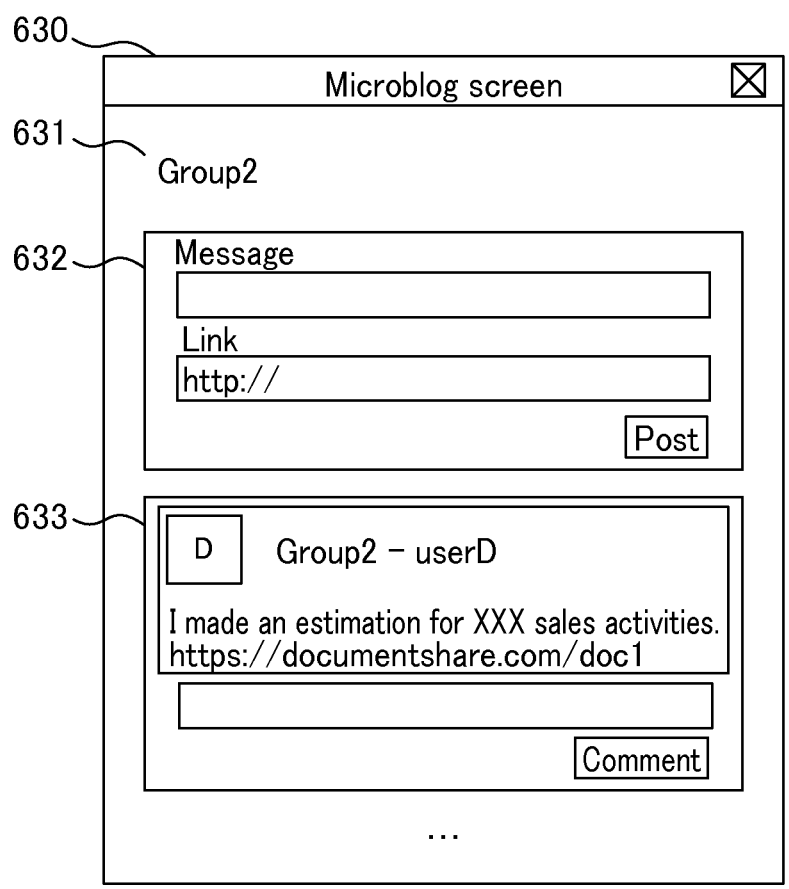

The timeline screen 630 shown in FIG. 7C is an example of the group's timeline screen. The timeline screen 630 is the timeline screen of the Group 2. The group's timeline screen is linked with the group name on the timeline screen and is displayed in response to the pressing of the group name linked therewith.

The group's timeline screen has a group information display area 631, a message posting area 632, and a comment posting area 633. Information about the group name 512 is displayed on the group information display area 631. The message posting area 632 is the same as the message posting area (612, 622) on a user's timeline screen but a message is posted by setting a group as a posting destination. The comment posting area 633 is the same as the message posting area (613 to 615, 623, and 624) on a user's timeline screen.

The message information 700 displayed on a group's timeline screen satisfies the following conditions:
(7) The group ID 704 of the posting destination 705 coincides with the group ID 511 of a display group.
(8) The group ID 511 of the display group coincides with the belonging group ID 507 of the user himself.
(9) The public information 514 about the display group is open to public.

The message information 700 that satisfies the aforementioned conditions and the comment information 710 linked with the message are displayed on a group's timeline screen. Note that the display order in the comment display area is in the order of a time series from new to old between the time 706 at which the message information 700 was posted and the time 715 at which the comment information 710 was posted.

Figure 8:
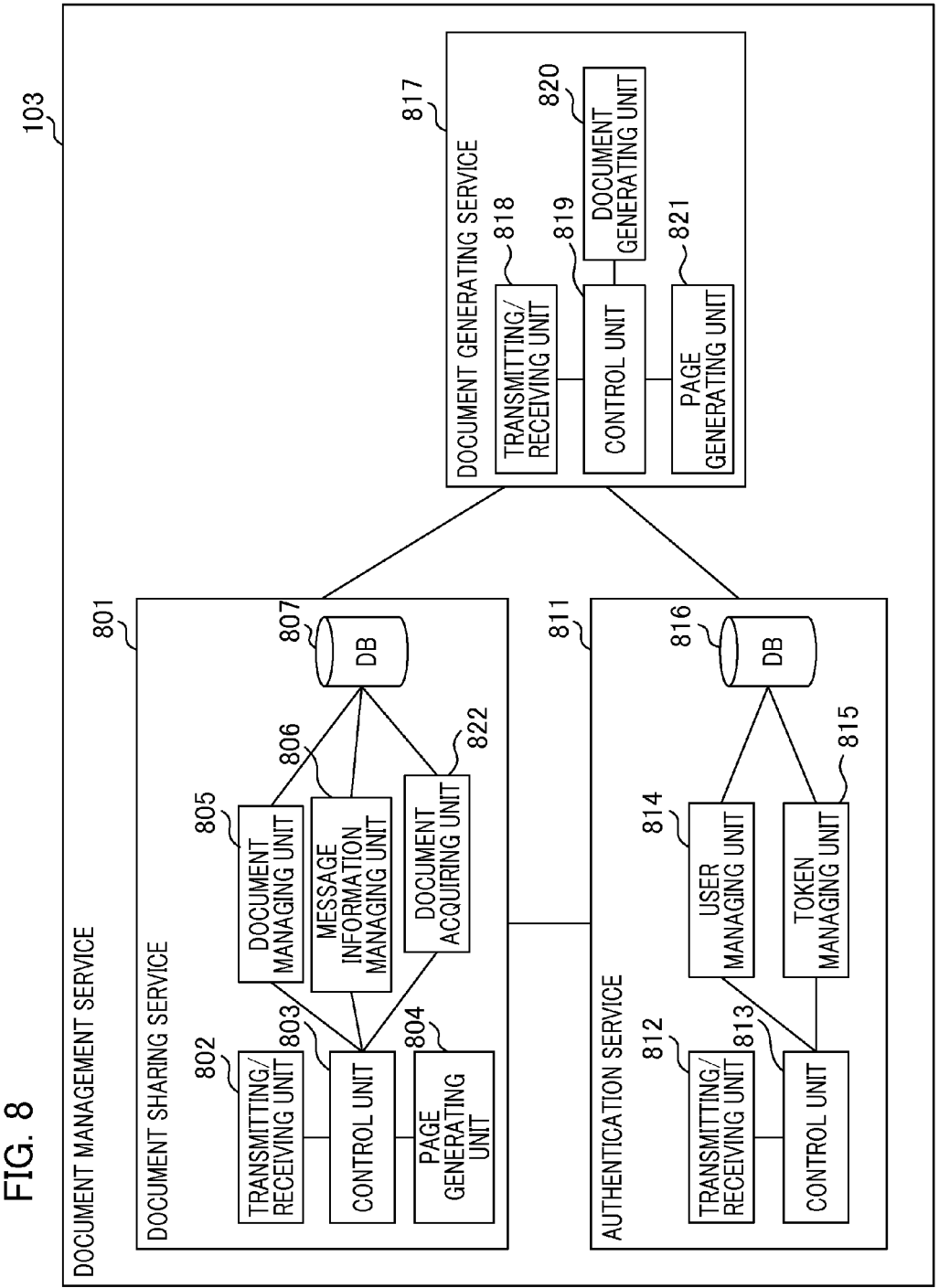
FIG. 8 is a diagram illustrating a configuration of a software module of a document management service.

FIG. 8 is a diagram illustrating a configuration of a software module of a document management service. The document management service 103 includes a document sharing service 801, a document generating service 817, and an authentication service 811. Note that software modules for realizing processing units provided in the services are stored in the HDD 204 shown in FIG. 2, are loaded onto the RAM 203 by the CPU 201 as described above, and are executed by the CPU 201.

The document sharing service 801 registers a document by a user as a sharing target to be shared with other users in response to a request from the document generating service. The document sharing service 801 includes a transmitting/receiving unit 802, a control unit 803, a page generating unit 804, a document managing unit 805, a message information managing unit 806, a document acquiring unit 822, and a DB 807.

Figure 11A:
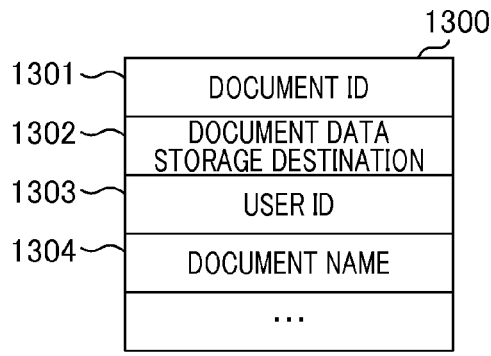
FIGS. 11A to 11E illustrate examples of document data information, message information, user information, authentication token information, and microblog access token information.

The transmitting/receiving unit 802 processes communication with the Web browser 104 of the client terminal 101, the microblog service 102, and the authentication service 811. The control unit 803 executes processing in accordance with a request accepted by the transmitting/receiving unit 802. The page generating unit 804 generates a Web page for returning a response to the Web browser 104. The document managing unit 805 manages document data stored in the DB 807 and document data information 1300 (FIG. 11A). The document managing unit 805 registers, acquires, updates, and deletes the document data and the document data information 1300 in response to the request from the control unit 803.

The message information managing unit 806 manages message information 1310 (FIG. 11B), which is information for associating the document data and the document information 1300 with a message on the microblog service 102, on the DB 807. The message information managing unit 806 registers, acquires, updates, and deletes message information in response to the request.

The document acquiring unit 822 acquires the message 702 from the microblog service 102 using the message ID 701 and the access token 532 in response to the request.

The DB 807 stores document data and the document information 1300, and message information. The DB 807 also stores user setting information or the like from the document sharing service 801. The user setting information is updated by a user (administrator) at any timing via the Web browser 104.

The document generating service 817 generates a document in response to a request from a user. The document generating service 817 includes a transmitting/receiving unit 818, a control unit 819, a document generating unit 820, and a page generating unit 821.

The transmitting/receiving unit 818 processes communication with the Web browser 104 of the client terminal 101, the microblog service 102, and the authentication service 811. The control unit 819 executes processing in accordance with a request accepted by the transmitting/receiving unit 818. The document generating unit 820 generates a document in response to the request from the control unit 819. The page generating unit 821 generates a Web page for returning a response to the Web browser 104.

The authentication service 811 manages various types of authentication information. The authentication service 811 includes a transmitting/receiving unit 812, a control unit 813, a user managing unit 814, a token managing unit 815, and a DB 816.

The transmitting/receiving unit 812 processes communication with the document sharing service 801. The control unit 813 executes processing in accordance with a request accepted by the transmitting/receiving unit 812. The user managing unit 814 manages user information 1320 (FIG. 11C) stored in the DB 816, and registers, acquires, updates, and deletes the user information 1320 in response to the request from the control unit 813. The token managing unit 815 manages authentication token information 1330 (FIG. 11D) stored in the DB 816 and microblog access token information 1340 (FIG. 11E). Furthermore, the token managing unit 815 registers, acquires, updates, and deletes the authentication token information 1330 and the microblog access token information 1340 in response to the request from the control unit 813.

Figure 9:
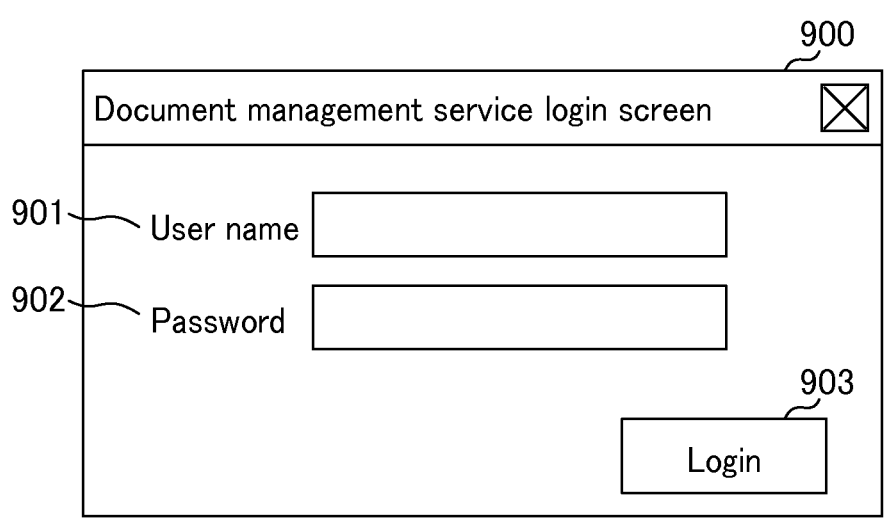
FIG. 9 is an exemplary document management service login screen.

FIG. 9 is a diagram illustrating an example of a document management service login screen 900. The page generating unit 804 of the document management service 103 generates the document management service login screen 900, and the Web browser 104 of the client terminal 101 displays the document management service login screen 900.

When a request is made from the Web browser 104 to the document management service 103, the transmitting/receiving unit 802 accepts the request, and the control unit 803 transmits an authentication check request to the authentication service 811 via the transmitting/receiving unit 802. At this time, the control unit 803 verifies whether or not an authentication token 1331 is included in the request. If the authentication token 1331 is included in the request, the control unit 803 passes the authentication token to the authentication service 811.

When the request is accepted by the transmitting/receiving unit 812 of the authentication service 811, the control unit 813 requests the token managing unit 815 to check validity of the authentication token information 1330 to be described below. Upon receiving the result of whether or not the authentication token is valid from the token managing unit 815, the control unit 813 transmits the result to the document sharing service 801 via the transmitting/receiving unit 812. The validity of the authentication token is checked with reference to the authentication token information 1330. The validity of the authentication token is confirmed by checking whether or not the authentication token 1331 in question is stored, whether or not the validity period has expired with reference to the time 1333, and the like.

When the authentication token is invalid, the control unit 803 of the document sharing service 801 instructs the page generating unit 804 to generate the document management service login screen 900 and sends the document management service login screen 900 as a reply to the request. When the authentication token is valid, the control unit 803 generates a document preview screen 1000 (FIG. 10) or the like to be described below in response to the request and sends the document preview screen 1000 as a reply to the request.

Figure 10:
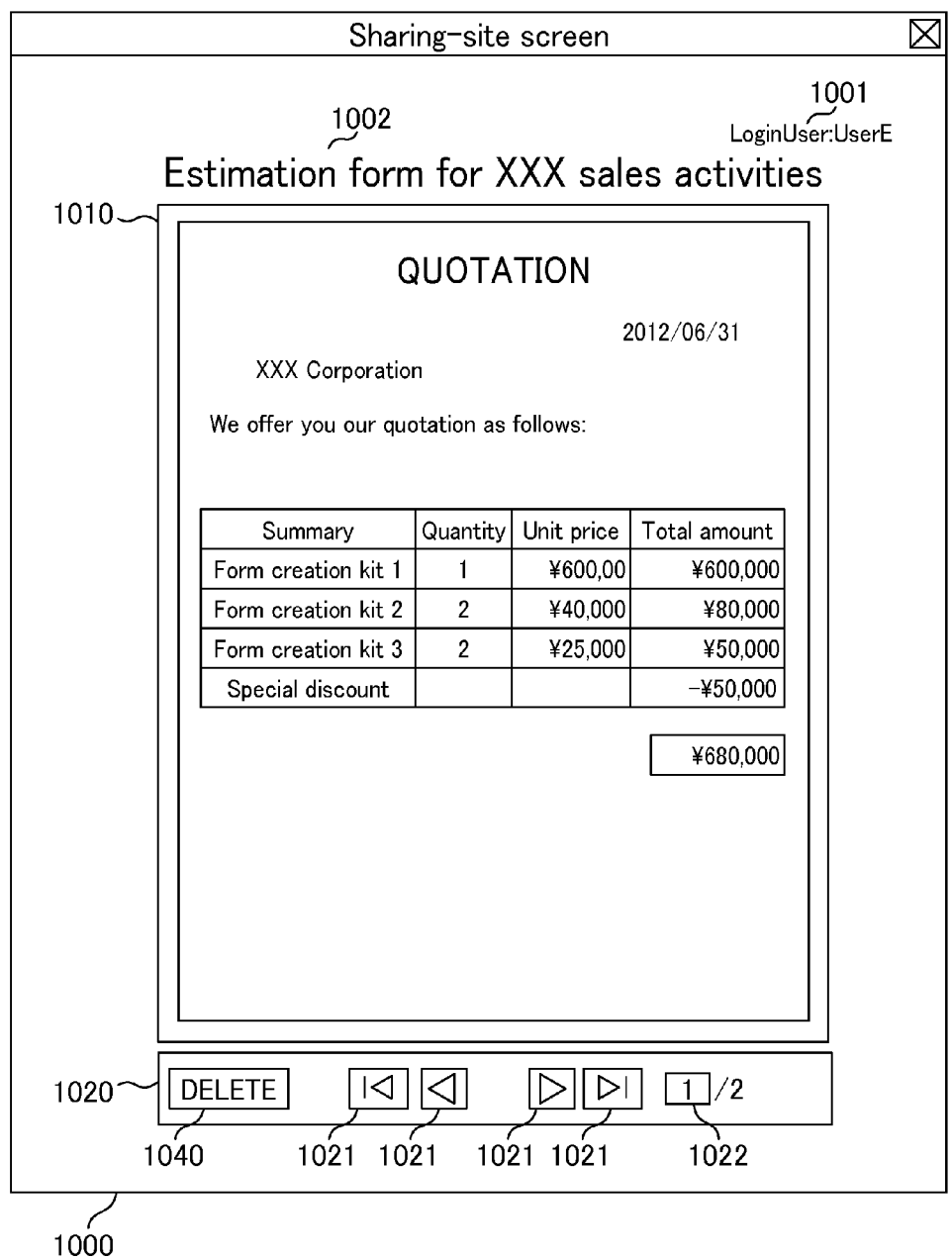
FIG. 10 is an exemplary document preview screen.

FIG. 10 is an example of the document preview screen 1000. The page generating unit 804 of the document sharing service 801 generates the document preview screen 1000, and the Web browser 104 of the client terminal 101 displays the document preview screen 1000.

When a document preview request including information for identifying a document is made from the Web browser 104 to the document sharing service 801, the transmitting/receiving unit 802 accepts the request, and the control unit 803 acquires the document data information 1300 from the document managing unit 805. Here, information for identifying a document transmitted from the Web browser 104 may be, for example, a URL including a document ID 1301. The control unit 803 can acquire the document data information 1300 meeting the request from the document managing unit 805 with reference to the document ID 1301 included in the URL. The control unit 803 causes the page generating unit 804 to generate the document preview screen 1000 which can be displayed on the Web browser 104 with reference to the acquired document data information 1300. Furthermore, the control unit 803 returns the generated document preview screen 1000 to the Web browser 104 via the transmitting/receiving unit 802.

A document data image 1010 acquired with reference to the document data storage destination 1302 of the document data information 1300, a document name 1002, a user name 1001, and the like are displayed on the document preview screen 1000. Buttons 1021 of page ejection and an input area 1022 for designating a page for display are displayed on an area 1020 for a preview operation.

Referring back to FIG. 9, the document management service login screen 900 has a user name 901, a password 902, and a login button 903. The user name 901 and the password 902 are input fields for a user name and a password required for authentication to the document management service 103. When the login button 903 is pressed, the Web browser 104 makes a login request to the document management service 103 using the input user name 401 and password 402 as parameters.

The control unit 813 of the authentication service 811 checks validity of the login request. The control unit 813 verifies whether or not the combination of the user name 901 and the password 902 included in the login request is present on the user information 1320 to be described below. When the combination of the user name 901 and the password 902 is present on the user information 1320, the control unit 813 issues the authentication token information 1330, and stores it in the DB 816 and returns the authentication token 1331 to the Web browser 104.

The Web browser 104 can continue authentication by adding an authentication ID to a request. Authentication information corresponding to all the requests to be made to the document management service 103 is managed by the authentication service 811. When the document management service 103 receives a request, the authentication information must always be verified. In the present embodiment, the verification of the authentication information will be omitted hereinafter.

FIG. 11 is a diagram illustrating examples of the document data information 1300, the message information 1310, the user information 1320, and the authentication token information 1330 which are managed by the document sharing service 801 and the authentication service 811.

Figure 11B:
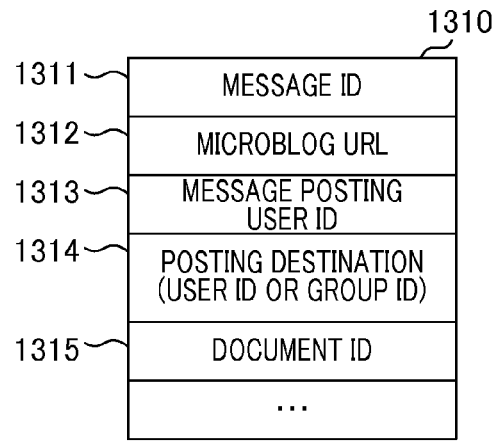

The document data information 1300 shown in FIG. 11A and the message information 1310 shown in FIG. 11B are information relating to document data to be stored in the DB 807 of the document sharing service 801.

The document data information 1300 is additional information relating to document data. The document data information 1300 has a document ID 1310, the document data storage destination 1302, a user ID 1303, and a document name 1304. The document ID 1301 is an identifier for uniquely identifying document data. The document data storage destination 1302 indicates a file path, a URL, or the like required for accessing document data. The user ID 1303 is an identifier representing a user of a document management service which has performed document data registration. The document name 1304 is a title of document data and a character string which may be arbitrarily determined by a user.

In addition, the document data information 1300 may also include any information relating to document data, such as the size of document data, the number of pages, and the like.

The message information 1310 is information relating to a message posted to the microblog service 102 with respect to document data to be stored in the document sharing service 801. The message information 1310 has a message ID 1311, a microblog URL 1312, a message posting user ID 1313, a posting destination 1314, and a document ID 1315.

The message ID 1311 is an identifier for uniquely identifying a message on the microblog service 102. The microblog URL 1312 is a URL for accessing the microblog service 102. For example, the end point URL of the Web service of the microblog service 102 is stored as the microblog URL 1312. The message posting user ID 1313 is the user ID of a user who posted a message on the microblog service 102. The posting destination 1314 indicates the ID of a message posting destination user or the ID of a posting destination group on the microblog service 102. The document ID 1315 is an identifier for associating the document data information 1300 with the message information 1310.

Figure 11C:
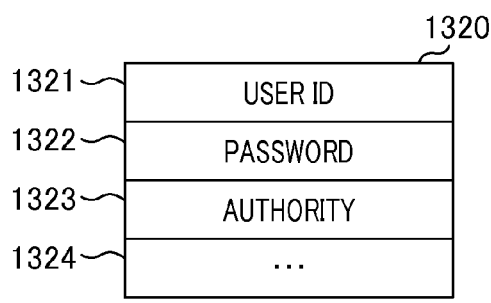
Figure 11D:
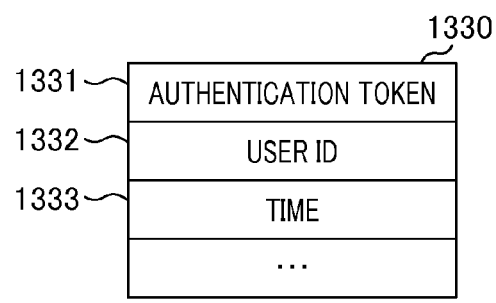
Figure 11E:
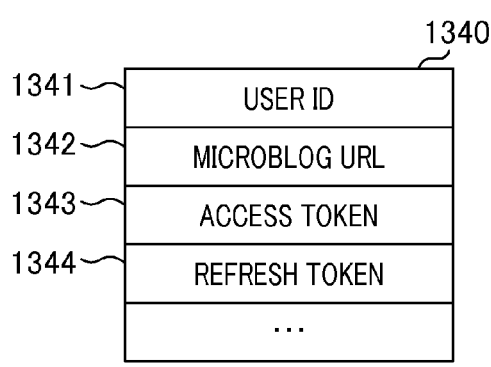

The user information 1320 shown in FIG. 11C, the authentication token information 1330 shown in FIG. 11D, and the microblog access token information 1340 shown in FIG. 11E are information relating to document data to be stored in the DB 816 of the authentication service 811.

The user information 1320 is information about a user registered as a user of the document management service 103. The user information 1320 has a user ID 1321, a password 1322, and an authority 1323. The user ID 1321 is an identifier for uniquely identifying a user in the document management service 103. The password 1322 is a password used for authentication in conjunction with the user ID 1321 when a user logs-in into the document management service 103 via the Web browser 104. The authority 1323 is information relating to available services when a user uses the document management service 103 via the Web browser 104. In addition, the user information 1320 may also include any information relating to a user, such as a name, a mail address, or the like.

The authentication token information 1330 is authentication information about a user who logged in the document management service 103. The authentication token information 1330 has an authentication token 1331, a user ID 1332, and a time 1333. The authentication token 1331 is a unique character string for providing a unique identification in at least the document management service so as to verify that a user has already been authenticated. The user ID 1332 is the user ID of a user who has already been authenticated. The time 1333 stores date or time for determining the validity period of the authentication token 1331.

The microblog access token information 1340 is user authorization information required when the document management service 103 accesses the microblog service 102. The microblog access token information 1340 has a user ID 1341, a microblog URL 1342, an access token 1343, and a refresh token 1344. The user ID 1341 is an identifier for identifying a user on the document management service 103 and corresponds to the user ID 1321 in the user information 1320.

The microblog URL 1342 is the URL of a microblog in which the microblog access token information 1340 is to be used, and corresponds to the microblog URL 1312 in the message information 1310. The access token 1343 is a character string including authorization information required when a user accesses the microblog URL 1342 using the user ID 1341. The refresh token 1344 is a token, which is issued by the microblog service 102, required for updating the access token 1343.

<Registration of a Document into the Document Management Service 103>

A description will be given of the flow of document registration processing for registering a document into the document management service 103 according to the present embodiment with reference to FIGS. 12 and 13.

Figure 12:
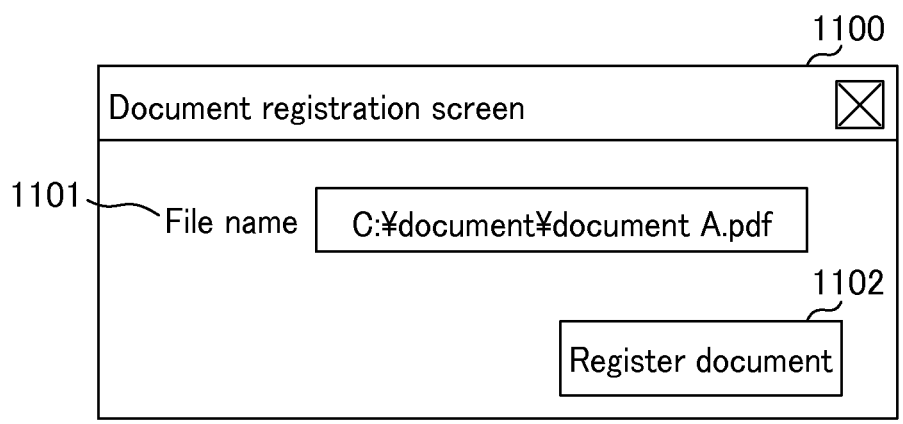
FIG. 12 illustrates an exemplary document registration screen.

FIG. 12 is a diagram illustrating an example of a document registration screen 1100. The document registration screen 1100 is a screen for instructing document registration. The Web browser 104 of the client terminal 101 accesses the document management service 103 to make a document registration screen display request in accordance with a user operation. The document management service 103 provides a document registration screen to the Web browser 104 in response to the request, so that the document registration screen 1100 is displayed on the Web browser 104.

The document registration screen 1100 has a file name 1101 for designating document data to be registered and a document registration button 1102. When a user presses the document registration button 1102, a document registration request for transmitting document data designated by the file name 1101 from the client terminal 101 to the document management service 103 is issued.

Figure 13:
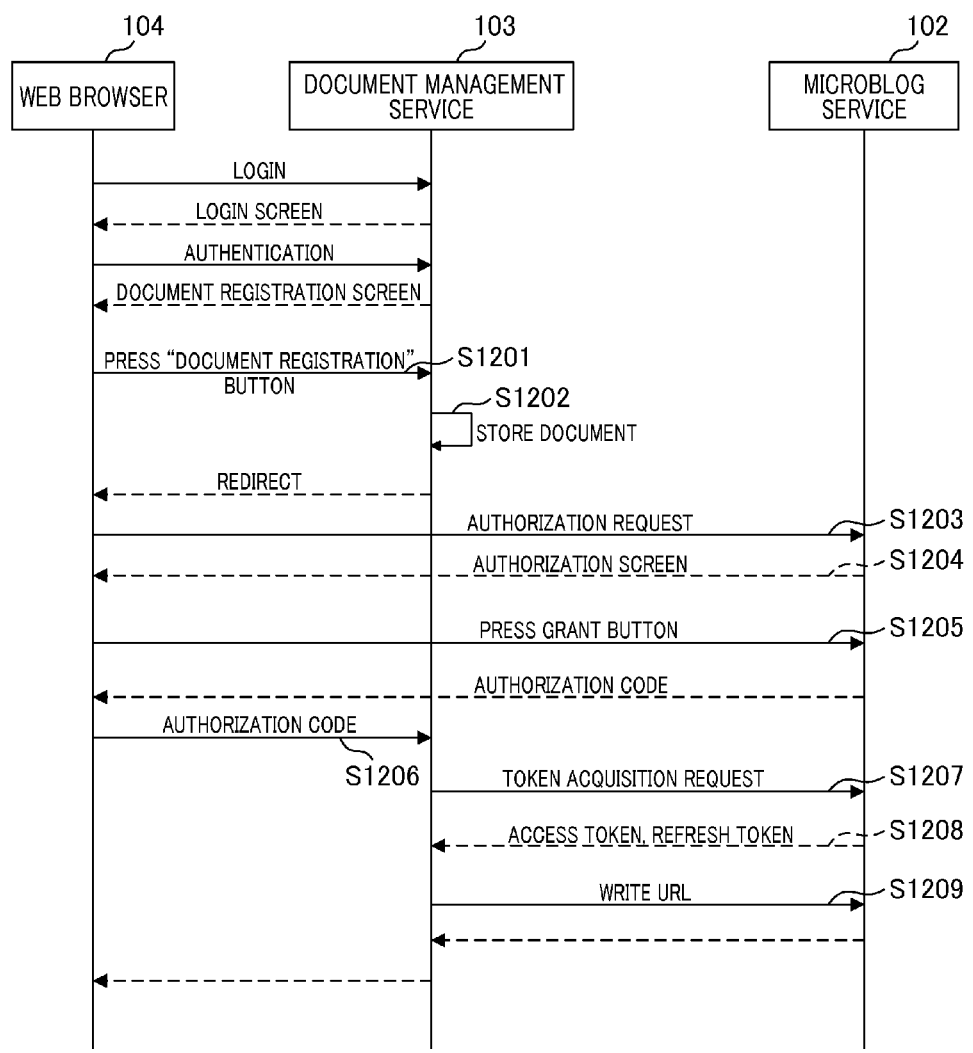
FIG. 13 is a diagram illustrating operation processing performed when a document management service receives a document registration request.

FIG. 13 is a diagram illustrating operation processing performed when the document management service 103 receives a document registration request. Assume that a user has already been logged in the document management service 103 after being subject to login/authentication processing by the operation on the login screen 900, and the document registration screen 1100 shown in FIG. 12 is being displayed on the Web browser 104.

The user presses the document registration button 1102 on the document registration screen 1100 displayed on the Web browser 104 of the client terminal 101 (step S1201). The Web browser 104 transmits document data and a document registration request to the document management service 103 in response to the pressing of the document registration button 1102.

Next, the control unit 803 of the document sharing service 801 causes the transmitting/receiving unit 802 to accept the document registration request, and causes the document managing unit 805 to store document data in the DB 807 (step S1202). The control unit 803 creates a document URL for uniquely accessing the stored document data.

Next, the control unit 803 executes the following processing via the transmitting/receiving unit 802 such that an access token acquisition request is made so as to enable posting of a message from the document management service 103 to the microblog service 102. The control unit 803 performs redirect processing for the Web browser 104 so that the Web browser 104 transmits an authorization request to the microblog service 102. The Web browser 104 transmits the authorization request in response to the redirect processing (step S1203), and receives an authorization screen (step S1204). When the user presses a grant button (step S1205), the Web browser 104 receives an authorization code from the microblog service 102, and conveys the authorization code to the document management service 103 (step S1206). The document management service 103 makes an access token acquisition request to the microblog service 102 using the received authorization code (step S1207), and acquires an access token (step S1208).

Specifically, in step S1208, the control unit 819 of the document generating service 817 functions as an authentication information acquiring unit that acquires an access token from the microblog service 102. The token managing unit 815 stores the acquired access token as the access token 1343 in the DB 816.

In step S1209, the message information managing unit 806 of the document management service 103 executes the following processing. The message information managing unit 806 transmits the access token 1343 acquired in step S1208 and the message posting request for writing the URI including the document URL as a message to the microblog service 102. In other words, the access token 1343 is authentication information used for posting a document from the document management service 103 to the microblog service 102.

The control unit 302 of the microblog service 102 which has received the message posting request causes the authenticating unit 304 to verify that the access token 1343 is a message write-permitted access token. When the access token 1343 is a message write-permitted access token, the control unit 302 causes the message managing unit 305 to store the URI including the document URL as a message in the message DB 306.

Document registration processing for registering a document into the document management service 103 is completed through the above processing. The registered document data is accessible by connecting the Web browser 104 to the microblog service 102 using the document URL described in the message.

<Temporal Storage of a Document in the Microblog Service 102>

Figure 14:
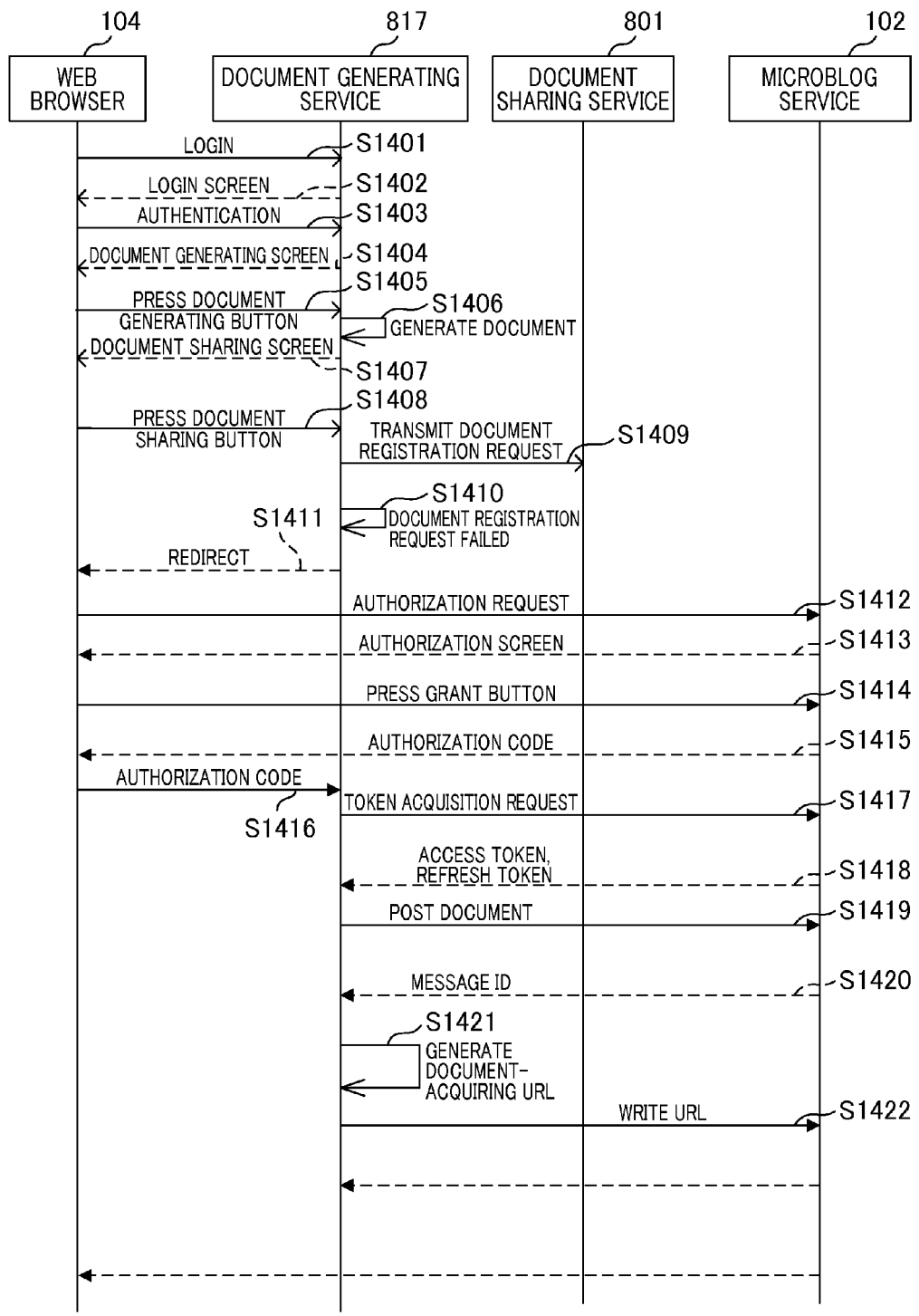
FIG. 14 is a diagram illustrating operation processing performed when a document management service receives a document sharing request.

FIG. 14 is a diagram illustrating operation processing performed when the document management service 103 receives a document sharing request. A description will be given of temporal storage of a document in the microblog service 102 according to the present embodiment and posting of a document-acquiring URL to the same with reference to FIG. 14. The document-acquiring URL is location information about a document temporarily stored in (posted to) the microblog service 102.

When the user accesses the document generating service 817 from the Web browser 104 of the client terminal 101 (step S1401), the document generating service 817 transmits the login screen 900 to the Web browser 104 (step S1402).

When the user presses the login button 903, the document generating service 817 transmits the input user name 401 and password 402 and the login request to the authentication service 811 (step S1403). Upon successful authentication, the document generating service 817 transmits a document generating screen 1600 to the Web browser 104 (step S1404).

Figure 15A:
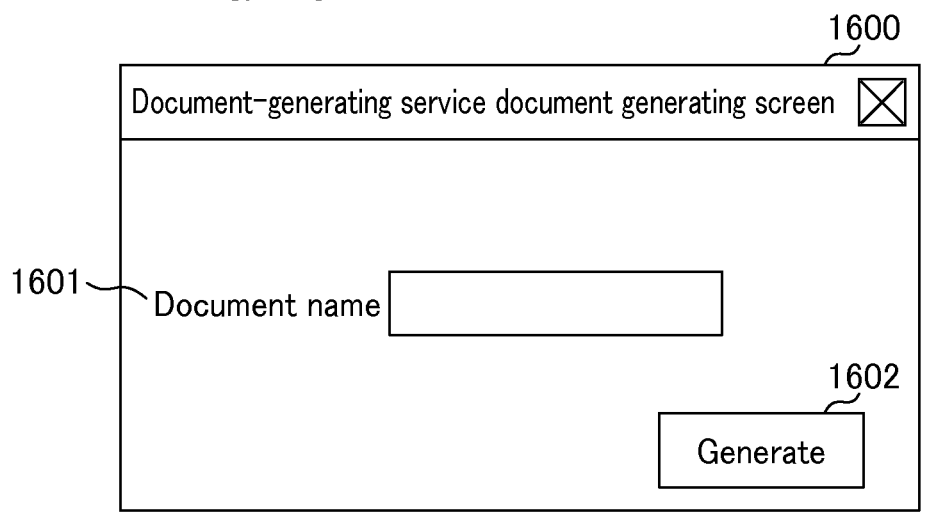
FIGS. 15A and 15B illustrate examples of a document generating screen and a document sharing screen.

FIG. 15A is a diagram illustrating an example of the document generating screen 1600. The name of a document to be generated is input to a document name 1601. A generation button 1602 is a button for making a document generating request.

When the user presses the generation button 1602 on the document generating screen 1600, the Web browser 104 transmits the input document name 1601 and the document generating request to the document generating service 817 (step S1405 in FIG. 14).

When the transmitting/receiving unit 818 of the document generating service 817 accepts the document generating request, the control unit 819 verifies parameters sent in conjunction with the document generating request, and instructs the document generating unit 820 to generate a document (step S1406). After generating the document, the document generating service 817 transmits a document sharing screen 1603 to the Web browser 104 (step S1407).

Figure 15B:
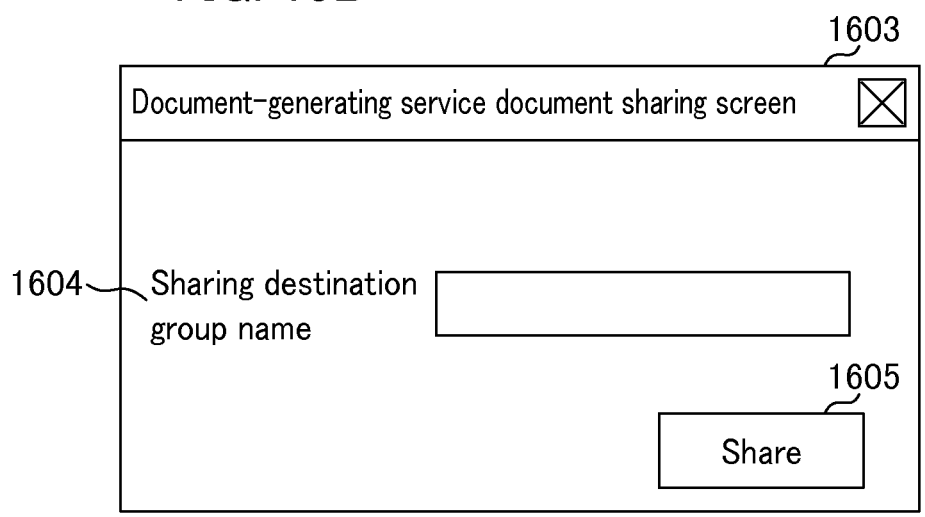

FIG. 15B illustrates an example of the document sharing screen 1603. Identification information about a sharing destination group to which sharing of a document is requested by a user is input to a sharing destination group name 1604. A share button 1605 is a button for making a document sharing request.

When the user presses the document sharing button 1605, the Web browser 104 transmits the sharing destination group name 1604 input to the document sharing screen 1603 and the document sharing request to the document generating service 817 (step S1408 in FIG. 14). The document registration request is a document sharing request made from a user of the client terminal 101. The document generating service 817 that has received the document sharing request via the transmitting/receiving unit 818 transmits the document and the document registration request to the document sharing service 801 (step S1409).

The control unit 819 of the document generating service 817 determines whether or not the requested document has been successfully registered. The processing performed when the document registration request is successful has already been described at the section <Registration of a document into the document management service 103>. Specifically, in step S1202 shown in FIG. 13, the control unit 803 of the document sharing service 801 registers the requested document as a sharing target among users into the document management service 103.

When the document registration request had failed (step S1410), the control unit 819 of the document generating service 817 functions as authentication information acquiring unit that acquires a user's access token from the microblog service 102 (steps S1411 to S1418). The processes in steps S1411 to S1418 have already been described in the above processes in steps S1203 to S1208 shown in FIG. 13, and thus, a detailed description thereof will be omitted. The token managing unit 815 stores the acquired access token as the access token 1343 in the DB 816.

The control unit 819 of the document generating service 817 posts (transmits) the acquired access token 1343 and the document to the microblog service 102 (step S1419). The control unit 302 of the microblog service 102 which has received the message posting request causes the authenticating unit 304 to verify that the access token 1343 is a message write-permitted access token. When the access token 1343 is a message write-permitted access token, the control unit 302 causes the message managing unit 305 to write the document as message data. Then, the control unit 302 sends the message ID 701 to the document generating service 817 (step S1420).

The control unit 819 of the document generating service 817 that has received the message ID 701 via the transmitting/receiving unit 818 generates a document-acquiring URL which is a character string having the sharing destination group name 1604 and the message ID 701 as parameters (step S1421). Specifically, the control unit 819 generates location information about the posted document linked to the message ID and the sharing destination group. Then, the control unit 819 transmits the access token 1343 and the URI (document-acquiring URI) including the document-acquiring URL as a message to the microblog service 102 (step S1422).

Processing for temporarily storing a document in the microblog service 102 and for posting a document-acquiring URL to the same is completed through the above processing. The registered document data is accessible from a message indicated by the message ID 701 by connecting the Web browser 104 to the microblog service 102.

<Reacquisition of a Document to the Document Sharing Service 801>

FIG. 16 is a diagram illustrating document reacquisition processing for the document sharing service 801. Document reacquisition processing is processing for registering a document registered in a microblog service (step S1419) into a document sharing service acquired from the microblog service when document transmission processing for transmitting a document from the document generating service 817 to the document sharing service 801 has failed (step S1410).

Assume that a user has already been logged in the microblog service 102 by the operation on the login screen 400, and the timeline screen 610 shown in FIG. 7A is being displayed on the Web browser 104.

The user presses a document-acquiring URI displayed on the timeline screen of the microblog service 102 using the Web browser 104 of the client terminal 101 (step S1501). The Web browser 104 transmits a document acquisition request having the sharing destination group name 1604 and the message ID 701 included in the document-acquiring URI as parameters to the document sharing service 801 in response to the pressing of the document-acquiring URI. The control unit 803 of the document sharing service 801 accepts the document acquisition request and then transmits the login screen to the Web browser 104. Specifically, the control unit 803 functions as a reaccepting unit that accepts a document sharing request made by a user again. The message ID 701 included in the document acquisition request identifies a posting of a document, which has failed to be registered in the document sharing service, to the microblog service 102.

Processing (steps S1504 and S1505) for logging in the document sharing service 801 is the same as that in steps S1401 to S1403 shown in FIG. 14, and thus, a description thereof will be omitted.

Upon successful user authentication by the document sharing service 801, the document sharing service 801 instructs the Web browser 104 to redirect the microblog service 102 (step S1506) so as to acquire the access token 1343 for the microblog service 102.

Processing (steps S1506 to step S1513) for acquiring the access token 1343 from the microblog service 102 is the same as that in steps S1411 to S1418 shown in FIG. 14, and thus, a description thereof will be omitted.

The document sharing service 801 transmits a document acquisition request including the access token 1343 and the message ID 701 to the microblog service 102 (step S1514).

The control unit 302 of the microblog service 102 which has received the document acquisition request causes the authenticating unit 304 to verify that the access token 1343 is a document acquisition-permitted access token. When the access token 1343 is a document acquisition-permitted access token, the control unit 302 causes the message managing unit 305 to transmit the document corresponding to the message ID 701 included in a document acquisition request to the document sharing service 801 (step S1515).

The control unit 803 of the document sharing service 801 causes the document acquiring unit 822 to acquire a document from the microblog service 102. Then, the control unit 803 instructs the document managing unit 805 to perform document registration processing using the acquired document, the sharing destination group name 1604, and the user ID 1303 (step S1516). Processing (steps S1516 and S1517) for generating a URL after document registration and posting the URL to the microblog service 102 is the same as that in steps S1201 to step S1209 shown in FIG. 13, and thus, a description thereof will be omitted.

Document reacquisition processing for the document sharing service is completed through the above processing. The reacquired document data is accessible from a message by connecting the Web browser 104 to the microblog service 102.

Figure 17:
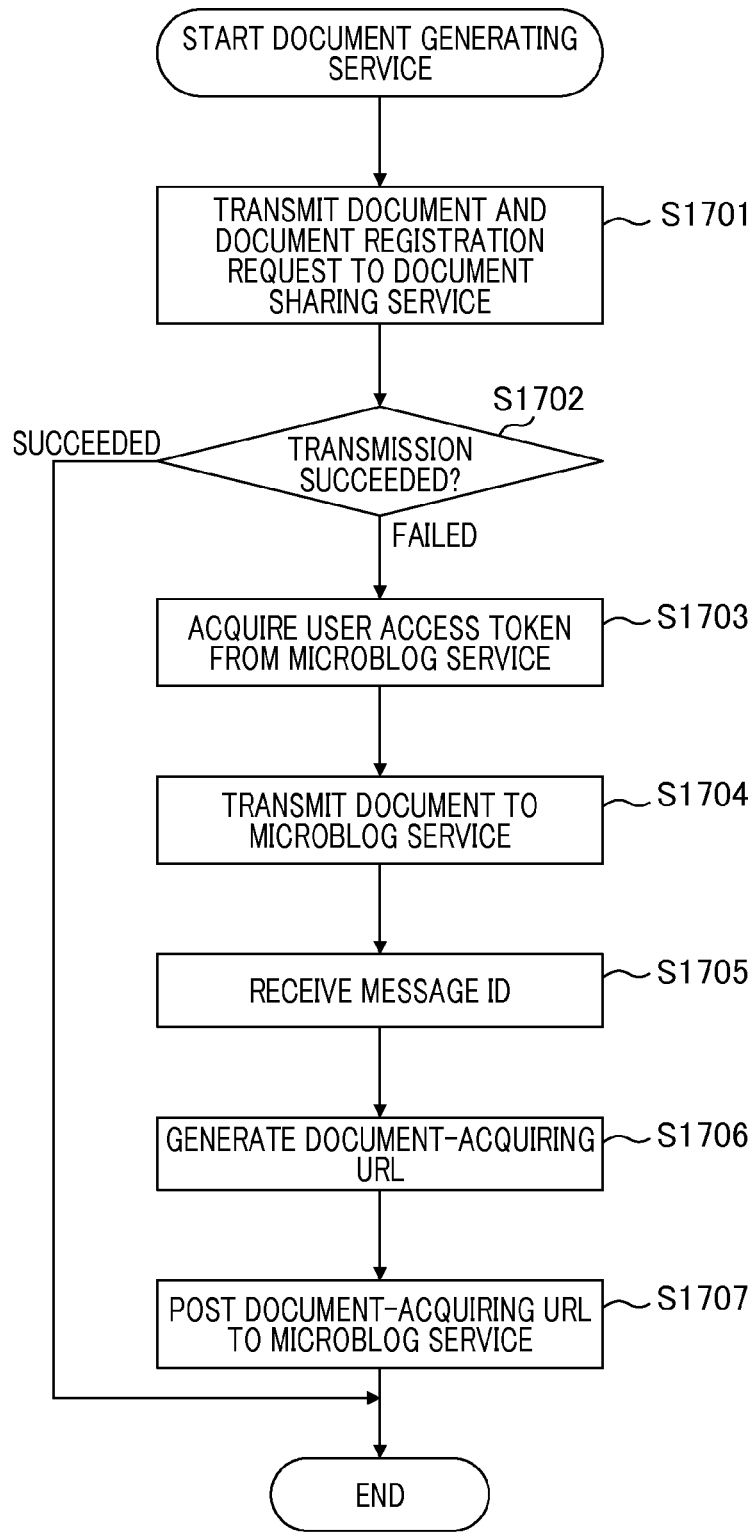
FIG. 17 is a flowchart illustrating document registration processing according to the present embodiment.

FIG. 17 is a flowchart illustrating document registration processing according to the present embodiment. When the control unit 819 of the document generating service 817 receives a document sharing request from a user after generating a document, the control unit 819 of the document generating service 817 transmits the generated document and the document registration request to the document sharing service 801 (step S1701).

The control unit 819 determines the result of transmission processing in step S1701 (step S1702). Successful transmission processing means that a document has been registered as a sharing target in the document sharing service 801. Thus, when transmission processing is successful, the process ends.

When transmission processing has failed, the control unit 819 acquires the access token 532 from the microblog service 102 (step S1703). Then, the control unit 819 posts the access token and the document to the microblog service 102 (step S1704). When the document is successfully posted to the microblog service 102, the control unit 819 receives the message ID 701 from the microblog service 102 (step S1705).

Next, the control unit 819 generates a document-acquiring URL based on the received message ID 701 and the sharing destination group name 1604 designated by the document sharing request (step S1706). Then, the control unit 819 posts a document-acquiring URI including the generated document-acquiring URL as a comment to the message ID 701 in conjunction with the access token 532 to the microblog service 102 (step S1707).

Figure 18:
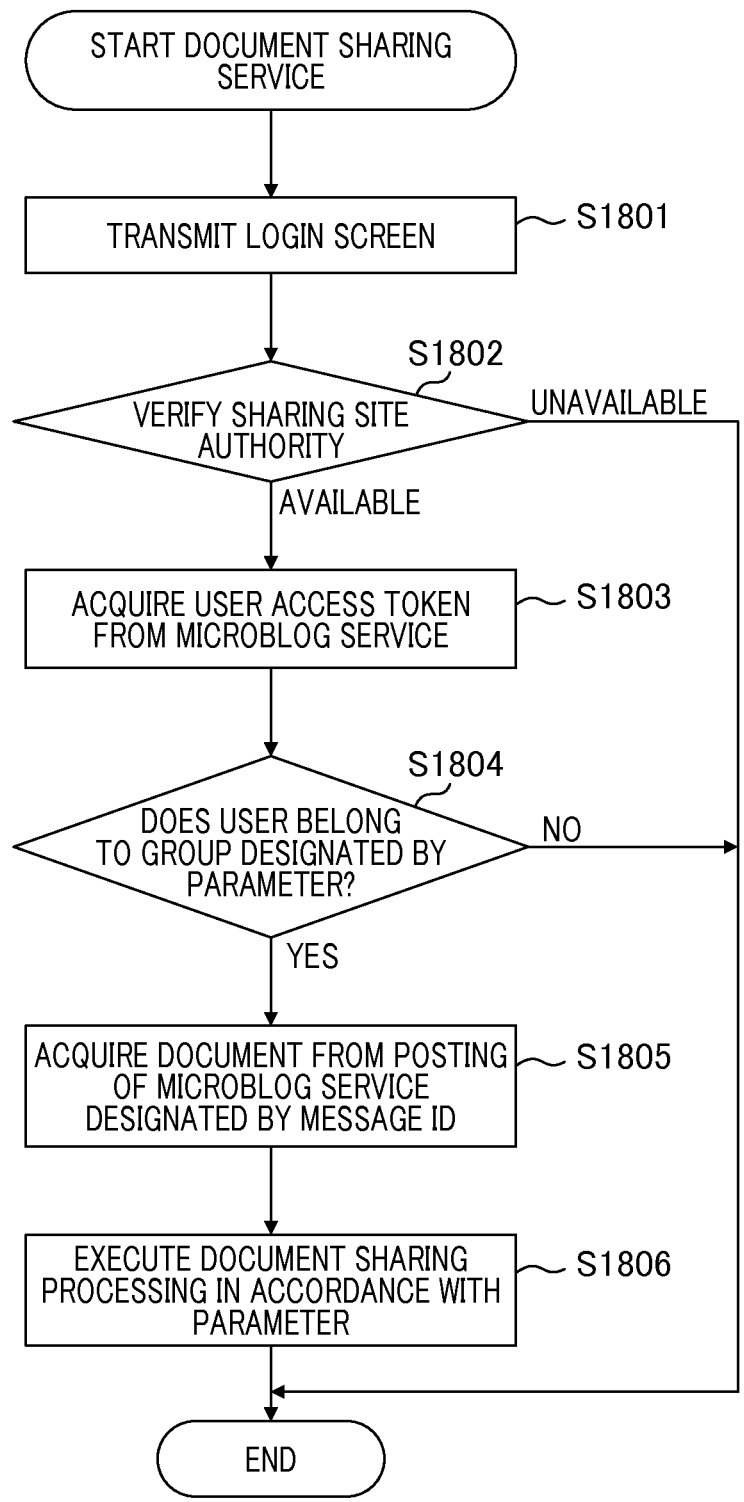
FIG. 18 is a flowchart illustrating document reacquisition processing according to the present embodiment.

FIG. 18 is a flowchart illustrating document reacquisition processing according to the present embodiment. When the control unit 803 of the document sharing service 801 receives a document acquisition request from the client terminal 101, the control unit 803 transmits a login screen to the client terminal 101 so as to perform user authentication (step S1801). Next, the control unit 803 determines whether or not a document sharing site managed by the document sharing service 801 is available for a user via the authentication service 811 (step S1802). More specifically, the authentication service 811 determines whether or not a document sharing site is available for a user with reference to the authority 1323 included in the user information 1320 stored in the DB 816, and then returns the result of determination to the control unit 803.

When a document sharing site is available for a user, the control unit 803 acquires the access token 532 from the microblog service 102 (step S1803). Next, the control unit 803 acquires a list of groups to which the user belongs so as to determine whether or not the user belongs to the sharing destination group which is received in conjunction with the document acquisition request and is indicated by the sharing destination group name 1604 (step S1804). When the user does not belong to the sharing destination group, the process ends. When the user belongs to the sharing destination group, the control unit 803 transmits the document acquisition request for the message ID 701 received in conjunction with the document acquisition request and the access token 532 to the microblog service 102. Consequently, the control unit 803 acquires a document corresponding to the message ID 701 (step S1805). After acquiring the document, the control unit 803 executes processing for sharing (registering) the acquired document using the sharing destination group name 1604 and the user ID 501 (step S1806).

Figure 19:
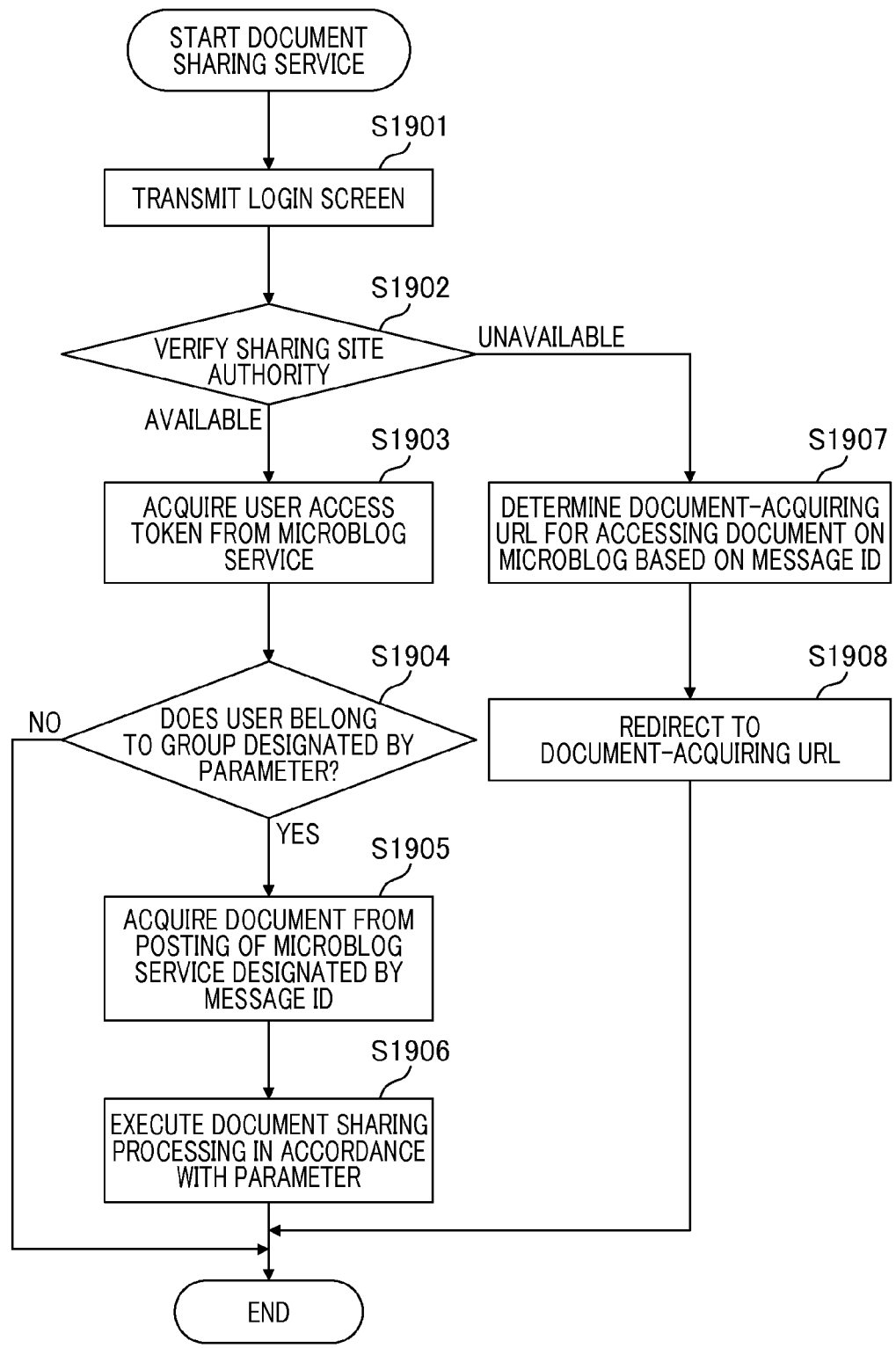
FIG. 19 is a flowchart illustrating document reacquisition processing according to another embodiment.

FIG. 19 is a flowchart illustrating document reacquisition processing according to another embodiment. Steps S1901 to S1906 shown in FIG. 19 are the same as steps S1801 to S1806 shown in FIG. 18.

When it is determined by the determination processing in step S1902 that a document sharing site is unavailable for a user (user does not have authority to utilize the document sharing function), the process advances to step S1907. Next, the control unit 803 determines a document-acquiring URL for accessing a document corresponding to the document sharing request based on the message ID 701 received in conjunction with the document sharing request (step S1908). Then, the control unit 803 redirects the document sharing request to the document-acquiring URL (step S1908). Specifically, the control unit 803 causes the client terminal 101 to access the document-acquiring URL, which has been failed to be registered in the document sharing site and been posted to the microblog service, linked to the message ID included in the document sharing request. Consequently, even when a document sharing request for sharing a document is transmitted from a user who is unavailable to a document sharing service, the document is displayed on the client terminal 101 by redirecting to the document-acquiring URL.

According to the information processing system of the present invention, a document can be shared with other users while holding a user-intended setting even when the user cannot register the document in a server having a document sharing function.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-087073, filed on Apr. 18, 2013 which is hereby incorporated by reference herein in its entirety.

What is claimed is:
1. An information processing system comprising:
a document management server that has a document sharing function; and
a posting management server that communicates with the document management server via a network and has a posting management function,
wherein the document management server comprises:
a memory for storing a computer program; and
at least one processor for executing the computer program to perform a process comprising:
accepting a first sharing request for sharing a document from a client terminal that is operated by a user;
registering, in the document management server, the document to which the first sharing request has been made as a sharing target among users;
determining whether or not the document has been successfully registered in the document management server;
posting, to the posting management server, information for accessing the document which has been registered in the document management server if it is determined that the document has been successfully registered in the document management server;
posting the document to the posting management server if it is determined that the document has failed to be registered in the document management server, wherein the posting management server is different from the client terminal;
accepting a second sharing request for sharing the document failed to be registered, wherein the second sharing request is transmitted from a client terminal that is operated by a user in response to the user's selection of information of the document posted to the posting management server, and wherein the second sharing request includes posting identification information for identifying the document posted to the posting management server;

acquiring, from the posting management server, the document corresponding to the posting identification information included in the second sharing request; and re-registering the acquired document as a sharing target among users, wherein, in a case where the user who made the second sharing request does not have authority to utilize the document sharing function, the document management server causes an information processing device operated by the user to access location information, which is linked to the posting identification information included in the second sharing request, about the document which has failed to be registered in the document management server and has posted to the posting management server.

2. The information processing system according to claim 1, wherein the posting management server transmits posting identification information for identifying the document that is posted to the posting management server by the document management server, wherein the process performed by the processor of the document management server further comprises:

receiving the posting identification information transmitted from the posting management server;

generating location information, which is linked to the received posting identification information, about the posted document; and posting the location information about the posted document to the posting management server.

3. The information processing system according to claim 2, wherein the second sharing request includes identification information about a sharing destination group to which the user requests sharing of the document, and the location information is generated based on the posting identification information received from the posting management server and the identification information about the sharing destination group included in the second sharing request.

4. The information processing system according to claim 2, wherein the location information about the posted document is posted to the posting management server as a comment to the posting of the document.

5. The information processing system according to claim 1, wherein the process performed by the processor of the document management server further comprises:

acquiring, in a case where it is determined that the document has failed to be registered in the document management server, authentication information from the posting management server for posting the document from the document management server to the posting management server, wherein the posting of the document is performed using the acquired authentication information.

6. The information processing system according to claim 1, wherein the posting management function is a microblog function.

7. A document management server that communicates with a posting management server having a posting management function via a network and has a document sharing function, the document management server comprising:

a memory for storing a computer program; and at least one processor for executing the computer program to perform a process comprising:

accepting a first sharing request for sharing a document from a client terminal that is operated by a user;

registering, in the document management server, the document to which the first sharing request has been made as a sharing target among users;

determining whether or not the document has been successfully registered in the document management server;

posting the document to the posting management server if it is determined that the document has failed to be registered in the document management server, wherein the posting management server is different from the client terminal;

posting, to the posting management server, information for accessing the document which has been registered in the document management server if it is determined that the document has been successfully registered in the document management server;

accepting a second sharing request for sharing the document failed to be registered, wherein the second sharing request is transmitted from a client terminal that is operated by a user in response to the user's selection of information of the document posted to the posting management server, and wherein the second sharing request includes posting identification information for identifying the document posted to the posting management server;

acquiring, from the posting management server, the document corresponding to the posting identification information included in the second sharing request; and re-registering the acquired document as a sharing target among users, wherein, in a case where the user who made the second sharing request does not have authority to utilize the document sharing function, the document management server causes an information processing device operated by the user to access location information, which is linked to the posting identification information included in the second sharing request, about the document which has failed to be registered in the document management server and has posted to the posting management server.

8. A document managing method executed by a document management server that has a document sharing function and communicates with a posting management server that has a posting management function, the method comprising:

accepting a first sharing request for sharing a document from a client terminal that is operated by a user;

registering, in the document management server, the document to which the first sharing request has been made as a sharing target among users;

determining whether or not the document has been successfully registered in the document management server;

posting the document to the posting management server if it is determined that the document has failed to be registered in the document management server, wherein the posting management server is different from the client terminal;

posting, to the posting management server, information for accessing the document which has been registered in the document management server if it is determined that the document has been successfully registered in the document management server;

accepting a second sharing request for sharing the document failed to be registered, wherein the second sharing request is transmitted from a client terminal that is operated by a user in response to the user's selection of information of the document posted to the posting management server, and wherein the second sharing request includes posting identification information for identifying the document posted to the posting management server;

acquiring, from the posting management server, the document corresponding to the posting identification information included in the second sharing request; and re-registering the acquired document as a sharing target among users, wherein, in a case where the user who made the second sharing request does not have authority to utilize the document sharing function, the document management server causes an information processing device operated by the user to access location information, which is linked to the posting identification information included in the second sharing request, about the document which has failed to be registered in the document management server and has posted to the posting management server.

9. A non-transitory computer-readable storage medium storing a program that when executed causes a computer of a document management server to perform a document managing method, the document management server communicating with a posting management server that has a posting management function, the method comprising:

accepting a first sharing request for sharing a document from a client terminal that is operated by a user;

registering, in the document management server, the document to which the first sharing request has been made as a sharing target among users;

determining whether or not the document has been successfully registered in the document management server;

posting the document to the posting management server if it is determined that the document has failed to be registered in the document management server, wherein the posting management server is different from the client terminal;

posting, to the posting management server, information for accessing the document which has been registered in the document management server if it is determined that the document has been successfully registered in the document management server;

accepting a second sharing request for sharing the document failed to be registered, wherein the second sharing request is transmitted from a client terminal that is operated by a user in response to the user's selection of information of the document posted to the posting management server, and wherein the second sharing request includes posting identification information for identifying the document posted to the posting management server;

acquiring, from the posting management server, the document corresponding to the posting identification information included in the second sharing request; and re-registering the acquired document as a sharing target among users, wherein, in a case where the user who made the second sharing request does not have authority to utilize the document sharing function, the document management server causes an information processing device operated by the user to access location information, which si linked to the posting identification information included in the second sharing request, about the document which has failed to be registered in the document management server and has posted to the posting management server.

* * * * *